United States Patent
Martos Triguero et al.

(10) Patent No.: US 12,164,553 B1
(45) Date of Patent: Dec. 10, 2024

(54) SYSTEMS AND METHODS FOR INTELLIGENT, SCALABLE, AND COST-EFFECTIVE DATA CATEGORIZATION

(71) Applicant: East West International Marketing Group Inc., Taipei (TW)

(72) Inventors: Francisco Martos Triguero, Taipei (TW); Clayton Jacobs, Taipei (TW); Min Te Chou, New Taipei (TW); Dominic Cope, Taipei (TW)

(73) Assignee: East West International Marketing Group Inc., Taipei (TW)

( * ) Notice: Subject to any disclaimer, the term of this patent is extended or adjusted under 35 U.S.C. 154(b) by 0 days.

(21) Appl. No.: 18/416,756

(22) Filed: Jan. 18, 2024

(51) Int. Cl.
*G06F 16/35* (2019.01)

(52) U.S. Cl.
CPC .................................. *G06F 16/353* (2019.01)

(58) Field of Classification Search
CPC ...................................................... G06F 16/353
See application file for complete search history.

(56) References Cited

U.S. PATENT DOCUMENTS

| | | | |
|---|---|---|---|
| 2016/0253364 A1* | 9/2016 | Gomadam | G06F 16/9024 707/739 |
| 2021/0256156 A1* | 8/2021 | Enuka | G06F 21/6245 |
| 2022/0292423 A1* | 9/2022 | Ash | G06Q 30/01 |
| 2024/0028621 A1* | 1/2024 | Rausch | G06F 16/2428 |

* cited by examiner

*Primary Examiner* — Mark D Featherstone
*Assistant Examiner* — Kweku William Halm
(74) *Attorney, Agent, or Firm* — FINNEGAN, HENDERSON, FARABOW, GARRETT & DUNNER LLP

(57) ABSTRACT

Described herein are methods, systems, and computer-readable media for classification. Techniques may retrieve content datasets, gather first sets of input data from the content datasets, and preprocess the first sets of input data. Techniques may next generate second sets of input data by embedding associated first metadata and second metadata, determine a plurality of contextual similarities based on contextual information, and generate third sets of input data by grouping one or more sets of input data based on the determined plurality of contextual similarities. Techniques may further determine, for each content dataset of the plurality of content datasets using one or more machine learning models, one or more second categories associated with the content dataset.

18 Claims, 16 Drawing Sheets

SYSTEMS AND METHODS FOR INTELLIGENT, SCALABLE, AND COST-EFFECTIVE DATA CATEGORIZATION

BACKGROUND

The amount of content produced is increasing year after year at a rapid pace, causing challenges for an individual to find relevant content for consumption. Brands wanting to advertise or collaborate with content producers have similar difficulty in finding relevant content and its producers to use for advertising their brands. Content can be categorized into separate buckets for easy discovery of relevant content. But the ever-increasing amount of content means categorizing content is a complex and expensive task, and categories applied to content become quickly outdated.

Existing systems use manual techniques to categorize the content. Content creators and other users of content use tags/keywords to categorize content under one or more categories. Such systems are prone to error with incorrect tagging and are difficult to scale. Some systems solve incorrect tagging by providing a short list of tags, but this results in widely different content being tagged with the same tags/keywords. Some systems offer custom tags or a longer list of crowd-sourced tags, but this can confuse a user/creator selecting from a long list of similar tags for categorizing content. For example, two custom tags used for categorization may be abbreviated and expanded form representing the same entity generated by different content creators causing unnecessary tagging with multiple tags that are the same. Also, some content platforms hosting content allow the application of categories by applying the same tags to all content from a creator, causing issues with wrong categorization when the content instances from the same content creator are on different topics. Also, predefined tags/keywords to categorize may not scale as additional categories cannot be applied over time for the same content. Further in existing systems, a tag or keyword used to categorize content has a static meaning as associated with a content and does not consider evolving meaning of the words used to tag the content. Such misaligned meaning presented by tags or keywords over time incorrectly categorizes content and can be discovered or monetized in wrong contexts.

Some existing systems use artificial intelligence/machine learning models to categorize content. Automatic categorization of content using artificial intelligence/machine learning models can help avoid above mentioned issues of improper and incorrect tagging and allow the application of new categories. However, traditional AI categorization systems may utilize predefined rules and older algorithms, causing issues with scalability and adaptability as well as requiring extensive time and costs to train the machine learning models.

As the amount of content continues to rise, there is a need to more accurately and efficiently categorize content across large datasets of content available on content platforms.

SUMMARY

Certain embodiments of the present disclosure relate to a method performed by a system for classification. The method may include retrieving, from a database, a plurality of content datasets, wherein each content dataset of the plurality of content datasets is associated with a person of the plurality of persons and includes content associated with the person, first metadata associated with the person, second metadata associated with the content, and one or more first categories associated with the content dataset, gathering first sets of input data from the plurality of content datasets, wherein each set of input data of the first sets of input data is associated with a person of the plurality of persons, preprocessing the first sets of input data, generating second sets of input data by embedding associated first metadata and second metadata into each set of input data of the preprocessed first sets of input data, determining a plurality of contextual similarities based on contextual information associated with the second sets of input data, wherein each contextual similarity comprises a measure of similarity in context between two persons of the plurality of persons, generating third sets of input data by grouping one or more sets of input data of the second sets of input data based on the determined plurality of contextual similarities, generating training data based at least on the third sets of input data, training one or more machine learning models based on the training data, and determining, for each content dataset of the plurality of content datasets using the trained one or more machine learning models, one or more second categories associated with the content dataset.

According to some disclosed embodiments, the content comprises at least one of text data, audio data, video data, image data, presentation data, metadata, tag data, header data, author data, or identification information in at least one of human, computer, and machine languages.

According to some disclosed embodiments, the person of the plurality of persons is an author of the associated content.

According to some disclosed embodiments, gathering first sets of input data from the plurality of content datasets comprises gathering one or more keywords from the plurality of content datasets.

According to some disclosed embodiments, preprocessing the first sets of input data comprises cleaning the first sets of input data, aggregating the cleaned first sets of input data, dividing the aggregated input data into a plurality of first subsets of input data, and normalizing the plurality of first subsets of input data.

According to some disclosed embodiments, cleaning the first sets of input data comprises resolving grammatical or typographical errors in the gathered first sets of input data.

According to some disclosed embodiments, the plurality of first subsets of input data comprises no more than a predetermined number of subsets.

According to some disclosed embodiments, normalizing the plurality of first subsets of input data comprises at least one of: removing one or more stop words from a corpus of keywords, removing one or more common words from the corpus of keywords, or normalizing text across different languages.

According to some disclosed embodiments, generating the second sets of input data comprises embedding associated first metadata and second metadata into each subset of the normalized plurality of first subsets of input data.

According to some disclosed embodiments, preprocessing the first sets of input data comprises: cleaning the first sets of input data, normalizing the cleaned first sets of input data to a specific range, and performing one or more data augmentation techniques to create variations of the first sets of input data.

According to some disclosed embodiments, cleaning the first sets of input data comprises: identifying one or more removeable sets of the first sets of input data to remove, wherein the one or more removeable sets are identified as corrupted or irrelevant, and removing the one or more removeable sets of the first sets of input data.

According to some disclosed embodiments, cleaning the first sets of input data comprises modifying at least one of a resolution or format of one or more sets of the first sets of input data.

According to some disclosed embodiments, generating tokenized data by tokenizing the second sets of input data based on the contextual information, wherein generating third sets of input data is based on the tokenized data.

According to some disclosed embodiments, generating tokenized data comprises tokenizing the second sets of input data into one or more single words or short sentences.

According to some disclosed embodiments, generating training data further comprises: identifying a plurality of keywords from the plurality of content datasets, ranking the plurality of keywords based on a frequency of occurrence, wherein a first keyword associated with a high frequency of occurrence is ranked higher than a second keyword associated with a low frequency of occurrence, and generating a first set of categories based on the ranked plurality of keywords.

According to some disclosed embodiments, generating training data further comprises: retrieving fourth sets of input data from the database, and generating the training data based on the third sets of input data, fourth sets of input data, and first set of categories.

According to some disclosed embodiments, the one or more machine learning models are part of a monolithic system.

According to some disclosed embodiments, the one or more machine learning models are part of a distributed system.

Certain embodiments of the present disclosure relate to a system for classification. The system includes one or more memory devices storing processor-executable instructions, and one or more processors configured to execute instructions to cause the system to perform a method. The method may include retrieving, from a database, a plurality of content datasets, wherein each content dataset of the plurality of content datasets is associated with a person of the plurality of persons and includes content associated with the person, first metadata associated with the person, second metadata associated with the content, and one or more first categories associated with the content dataset, gathering first sets of input data from the plurality of content datasets, wherein each set of input data of the first sets of input data is associated with a person of the plurality of persons, preprocessing the first sets of input data, generating second sets of input data by embedding associated first metadata and second metadata into each set of input data of the preprocessed first sets of input data, determining a plurality of contextual similarities based on contextual information associated with the second sets of input data, wherein each contextual similarity comprises a measure of similarity in context between two persons of the plurality of persons, generating third sets of input data by grouping one or more sets of input data of the second sets of input data based on the determined plurality of contextual similarities, generating training data based at least on the third sets of input data, training one or more machine learning models based on the training data, and determining, for each content dataset of the plurality of content datasets using the trained one or more machine learning models, one or more second categories associated with the content dataset.

Certain embodiments of the present disclosure relate to a non-transitory computer readable medium including instructions that are executable by one or more processors to cause a system to perform a method for classification. The method may include retrieving, from a database, a plurality of content datasets, wherein each content dataset of the plurality of content datasets is associated with a person of the plurality of persons and includes content associated with the person, first metadata associated with the person, second metadata associated with the content, and one or more first categories associated with the content dataset, gathering first sets of input data from the plurality of content datasets, wherein each set of input data of the first sets of input data is associated with a person of the plurality of persons, preprocessing the first sets of input data, generating second sets of input data by embedding associated first metadata and second metadata into each set of input data of the preprocessed first sets of input data, determining a plurality of contextual similarities based on contextual information associated with the second sets of input data, wherein each contextual similarity comprises a measure of similarity in context between two persons of the plurality of persons, generating third sets of input data by grouping one or more sets of input data of the second sets of input data based on the determined plurality of contextual similarities, generating training data based at least on the third sets of input data, training one or more machine learning models based on the training data, and determining, for each content dataset of the plurality of content datasets using the trained one or more machine learning models, one or more second categories associated with the content dataset.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
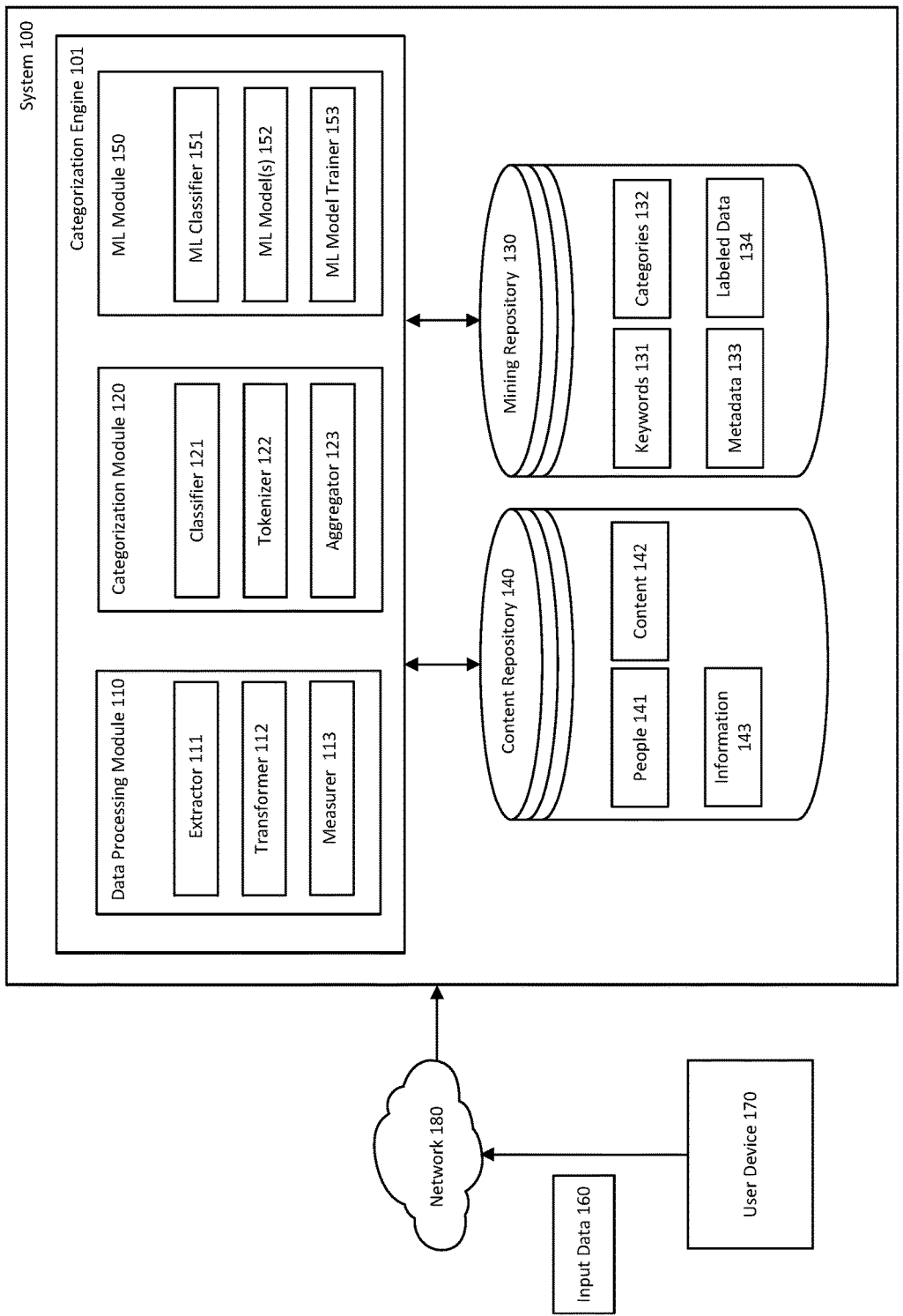
FIG. 1 is a block diagram showing various exemplary components of an example data categorization system, according to some embodiments of the present disclosure.

In the following detailed description, numerous specific details are set forth in order to provide an understanding of the disclosed example embodiments. However, it will be understood by those skilled in the art that the principles of the example embodiments may be practiced without every specific detail. Well-known methods, procedures, components, variations, and design or implementation choices have not been described in detail so as not to obscure the principles of the example embodiments. The example methods and processes described herein are neither constrained to a particular order or sequence nor constrained to a particular system configuration. Additionally, some of the described embodiments or elements can occur or be performed simultaneously or jointly. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for reviewing and evaluating vast amounts of content to classify the contents. The classification may be used for various purposes, such as for discovery, inquiry, grouping, or search of relevant instances of content. These technologies can use information relevant to the specific domain and application of multi-layered architecture of classifications to provide classification close to, mimic, or as effective as a manual tagging of individual instances of content. Further, the technologies and techniques herein can interpret the available content to extract data associated with the specific domain, context, subject matter, nature, and type of the content instance. The described technologies can synthesize the extracted data into valuable features, that can be used to analyze and generate various relevant classifications to associate with each instance of content.

The embodiments describe ways to use categorization data associated with individual content instances to generate higher-level categorization data, reducing the cost and time to generate additional categorization data. The embodiments use statistical techniques to generate a hierarchy of categories to apply to instances of content quickly. A hierarchy of categories helps provide more context to what is described within a content instance by adding categories to a group of content instances created/authored/grouped by a source. Similarly, adding categories to entire content in a platform's database helps with additional contextual information describing a content instance.

The embodiments further describe ways to classify content and content sources/creators using artificial intelligence. The embodiments implement several data preprocessing techniques to reduce noise and optimize computational resources for training and using machine learning models. In addition, the embodiments train one or more machine learning models by generating weak and strong labels using contextual information, content, and metadata stored in a database. Combining weak and strong labels can help increase a classification accuracy of the one or more machine learning models. Furthermore, the use of a distributed machine learning system may provide additional benefits. For example, using a distributed machine learning system may provide computational benefits by allowing parallel computations that may result in improved performance when processing large amounts of data. Additionally, a distributed machine learning system may improve classification accuracy by using a hierarchical split of data across multiple models. For example, data may be split based on a high-level category and further subdivided into more specific sub-categories such that each node of the distributed machine learning system may focus on a specific level of the hierarchy. As such, a distributed machine learning system architecture may help to efficiently distribute the data and enhance overall performance and accuracy of the machine learning system.

These technologies can evaluate data sources and data, prioritize their importance based on domain(s), circumstance(s), subject matter(s), and other specifics or needs, and provide predictions that can be used to help evaluate potential courses of action. The technologies and methods allow for the application of data models to personalized circumstances and for other uses or applications. These methods and technologies allow for detailed evaluation that can improve decision making, marketing, sponsorship evaluation, consumer, and other content insights on a case-by-case basis. Further, these technologies can evaluate a system where the process for evaluating outcomes of data may be set up easily and repurposed by other uses of the technologies.

FIG. 1 is a block diagram showing various exemplary components of an example data categorization system, according to some embodiments of the present disclosure. The components in the system may reside in one system or across a distributed system, and may be software-operated or driving modules formed by configuring one or more processors to provide the examples of functions, operations, or processing described below. As illustrated in FIG. 1, system 100 may include categorization engine 101, which may determine relevant content instances in content repository 140 to associate with a category. The resulting information may be information to be added or output to be provided for a query in input data 160. System 100 may analyze data in content repository 140 at regular intervals or in response to requests, using categorization engine 101 to generate relevant categories to associate with content instances in content repository 140. System 100 may also utilize pre-existing information in mining repository 130 to access categories or determine categories to associate with content in content repository 140. In some embodiments, system 100 may execute periodically to recalculate keywords or tags to associate with content instances to categorize content and content creators. System 100 may run at regular intervals based on configuration provided by a user via user device 170 in input data 160 with a request to categorize content instances. System 100 may run periodically to accommodate new content instances when categorizing content. In some embodiments, system 100 may run periodically to accommodate updating meanings of keywords or tags associated with content instances and categorized based on associated keywords or tags. For example, tag "#YOLO," was originally associated with inspirational content, but has since become associated with reckless or irresponsible behavior. In such scenarios, it is important to categorize content appropriately and not rely on the initial meaning of a tag to avoid incorrect content instances being discovered for consumption and monetization.

Categorization engine 101 may include data processing module 110, categorization module 120, and machine learning (ML) module 150. Data processing module 110 may determine information 143 needed for categorization. Categorization module 120 may associate categories to content based on information determined by data processing module 110. ML module 150 may infer categories or classifications to associate with content creators by training one or more machine learning models to infer one or more classifications. Categorization engine 101 may access content repository 140 and use the information therein to determine categories to associate with content 142. Categorization engine 101 may use mining repository 130 to store and access previously determined categories associated with content 142. Categorization engine 101 may select relevant content instances from content 142, and such selection may be based on a query in input data 160 utilizing categories 132 in mining repository 130.

Categorization engine 101 may use data processing module 110 to retrieve and process information 143 associated with content 142 to generate multi-level categories 132 to associate with content instances in content 142. Data processing module 110 may process and retrieve data to use as input to generate categories 132 to associate with content instances in content 142. Data processing module 110 may also process various category data to determine the final classification represented by categories 132 associated with content instances in content 142. As illustrated in FIG. 1, data processing module 110 may include extractor 111, transformer 112, and measurer 113. Those components may extract and transform data from content instances in content 142 to determine and associate categories 132. In some embodiments, these components may also help determine the final classification of a content instance in content 142 by associating multi-level categories in categories 132. Data processing module 110 may help generate multi-level categories by processing data retrieved from a content instance in content 142 and applying categorization for different overlapping groups of content instances in content 142, including the currently processed content instance in content 142.

Data processing module 110 may retrieve data within a content instance in content 142 to generate information 143 needed to generate and associate categories of categories 132 with a content instance. For example, data within a content instance can be the text representation of audio with a content instance. In some embodiments, data processing module 110 may generate information 143 by identifying and analyzing events in a content instance. For example, data processing module 110 may process a video from a security camera to identify motion detection events and may analyze the video to identify the type of object that triggered the motion detection event and include these details as information 143 in a video. In another example, information 143 may also include data from analysis of events such as types of objects, number of objects, and description of objects that are part of events. In some embodiments, data processing module 110 may retrieve information from context data associated with a content instance, for example, title, description of a content instance, and tags included by a creator of a content instance. The context data may also include categories selected by a creator of a content instance from a list of categories available on a platform hosting content instances in content 142. Data processing module 110 may employ extractor 111 to extract data in a content instance in content 142 to generate information.

Extractor 111 may help categorize an instance of content 142 by extracting information 143 included with a content instance. Information 143 may include context data associated with a content instance in content 142. For example, the title and description of a video content instance may be part of the extracted information. In some embodiments, extractor 111 may analyze a content instance to extract information 143. For example, a textual representation of speech in a video content instance is part of the extracted information 143. Extractor 111 may begin processing content 142 by considering a single content instance in content 142 associated with a particular group. Extractor 111 may process content instances in content 142 pre-grouped automatically or manually. The content may be pre-grouped automatically based on a person of people 141 or manually by the author of content instances. For example, extractor 111 may process video content of all videos uploaded by a person or a subset of videos grouped as a playlist by a person. Information 143 may be used as input by other components in data processing module 110 to generate keywords 131, categories 132, and metadata 133.

Extractor 111 may further help categorize a person of people 141 by extracting information 143 included with content associated with the person. For example, creator metadata, such as a geographical location, gender, and age of a person who created content, may be part of the extracted information.

Transformer 112 may clean information 143 retrieved by extractor 111 before categorizing content instances in content 142. Transformer 112 may clean information 143 by regrouping into new groups or transforming information 143. Transformation may include reordering information 143 extracted by extractor 111. For example, transformer 112 may reorder keywords representing extracted information 143. In some embodiments, transformation may include resolving typographical and grammatical errors.

Transformer 112 may clean extracted information by using contextual information associated with an instance of content 142. Contextual information may include additional context data, such as tags associated with a content instance. In some embodiments, transformer 112 may determine contextual information by analyzing context data associated with a content instance in content 142. For example, transformer 112 may determine contextual information by analyzing the relation between tagged keywords of context data associated with a content instance. In some embodiments, transformer 112 may determine relationship data by calculating the distance between two tagged keywords associated with a content instance. A short distance may represent closely related keywords. A set of tagged keywords with a significant distance may be considered incorrect tagging or less relevant tagging. Distance between tagged keywords may be based on the difference in meaning between two keywords. For example, the relationship distance between tagged keywords, San Francisco, and SF associated with a content instance would be short as they both represent the same geographical region, San Francisco. In another example, the relationship distance between tagged keywords, beauty, and make-up associated with a content instance may also be short, as they are associated with the cosmetics industry.

In some embodiments, keywords tagged to a content instance may be associated with topics presented in a content instance. Transformer 112 may determine a relationship between such keywords and topics presented in a content instance by calculating a relationship distance between keywords and topics. Such keywords diverging from a topic indicated by a distance from a topic may indicate less relevant tagged keywords or a typographical error. Transformer 112 may use contextual information within a content instance to determine the relationship between tagged keywords. For example, a video content instance in a travel vlog of content may provide context and confirm whether the tagged keywords are correct information. In some embodiments, transformer 112 may clean extracted information by fixing grammatical and typographic errors. Transformer 112 may confirm the resolution of such errors by re-calculating relation distances between keywords in the extracted information.

In some embodiments, transformer 112 may clean the extracted information by removing a stop word or a common word from a corpus of keywords (e.g., keywords 131) associated with a content instance of content 142. In some embodiments, transformer 112 can remove a varying number of stop words and common words from a corpus of keywords associated with an instance in content 142. The corpus of keywords may include the cleaned information and keywords tagged to content instances. The corpus of keywords may be associated with a person in people 141 who is the author of an instance of content 142 used to obtain the clean information.

Categorization module 120 may generate a set of categories of a group of content instances in content 142. A group of content instances may be associated with a person of people 141 who is an author of a group of content instances or shares a group of content instances. In some embodiments, categorization module 120 may generate a set of categories of multiple groups of content instances in content 142.

Categorization module 120 may generate categories to associate with an instance in content 142 by utilizing sets of categories of categories 132 generated for different groups of content instances along with categories of categories 132 associated with each instance in content 142. Categorization module 120 may combine multiple sets of categories by first classifying each content instance of content 142 using categories 132. Categorization module 120 may classify each instance of content 142 associated with information of information 143 extracted by extractor 111 and cleaned by transformer 112 of data processing module 110. Categorization module 120 may then determine the classification information of groups of content instances in content 142 to help categorize each instance in content 142. Categorization module 120 may employ classifier 121 to classify the cleaned information provided by extractor 111 into a set of categories and store them in categories 132 in mining repository 130.

Classifier 121 may classify a first content instance of content 142 by processing the data of content 142 present in information 143. For example, classifier 121 may process a content instance of content 142 by accessing text associated with the first instance of the content to determine one or more keywords to add to keywords in keywords 131 tagged to the first content instance. Classifier 121 may further classify a first content instance and additional classification using another content instance in content 142.

Classifier 121 may select another instance of content 142 from a set of videos grouped by criteria. For example, classifier 121 may identify another instance in content 142 authored or owned by the same person of people 141 who owns or authored the classified first content instance in content 142.

Classifier 121 may add additional classifications to a first content instance in content 142 in three steps. In step 1, tokenizer 122 may tokenize information extracted and cleaned using data processing module 110. Tokenization may be performed on each keyword associated with a content instance in content 142 extracted using extractor 111. Keywords associated with a content instance may be accessed from information 143 extracted from a content instance. Tokenizer 122 may access information 143 representing text data of a content instance. Tokenizer 122 may tokenize sentences of text data extracted from a content instance in content 142. For example, tokenizer 122 may tokenize each word of each sentence in the textual representation of speech in a video content instance. Tokenizer 122 may tokenize a sentence in accessed textual information 143 by adding start and stop tokens to the beginning and end and identifying each word. Tokenizer 122 may consider each word in the tokenized sentence as a keyword. Tokenizer 122 may tokenize keywords from extracted information into single words or short sentences.

Tokenizer 122 may access text data in a content instance of content 142 by converting audio using speech-to-text software. In some embodiments, tokenizer 122 may access text in a separate subtitles file of a content instance in content 142. In some embodiments, tokenizer 122 may tokenize textual description of content instance. For example, a video feed from a camera may be analyzed by extractor 111 to extract motion detection information in the form of time, date, and type of motion describing a moving object.

In step 2, tokenizer 122 may generate embeddings of the tokenized keywords. Embeddings may include additional information on tokenized keywords from step 1. Tokenizer 122 may generate additional information for embeddings based on the similarity of tokenized keywords. Tokenizer 122 may utilize keywords 131 associated with a content corpus, including the first instance of the content, to determine the similarity of tokenized keywords. Embeddings may also include transformed representations of tokenized keywords. For example, an embedding of a tokenized keyword can include all positions a tokenized keyword is present in a sentence of information 143.

In step 3, tokenizer 122 may extract features of the embeddings prepared in step 2. A feature may describe a tokenized keyword association to a content instance in content 142. In some embodiments, a feature may describe a tokenized keyword association with a corpus of keywords (e.g., keywords 131) associated with a content instance in content 142. For example, a feature may include the frequency of use of a keyword in textual data in information 143 associated with a content instance. In another example, a feature may include a keyword's position(s) in a content instance's textual data in information 143.

Tokenizer 122 may extract features of the embeddings using a variety of techniques, including bag of words model and term frequency/inverse document frequency (TF/IDF) model. In some embodiments, tokenizer 122 may extract features for each category of a set of categories. Classifier 121 may first determine a set of categories based on information 143 associated with a source, for example, a person in people 141. In some embodiments, a source may be an automated machine such as a CCTV/Security camera capturing moving objects. In some embodiments, information associated with a person includes cleaned information in information 143 associated with the first instance in content 142 processed by data processing module 110.

Aggregator 123 may aggregate information 143 output by extractor 111 with a second set of categories determined using categorization module 120. Second set of categories may include categories of a group of content instances. Aggregator 123 may aggregate categories of content instances associated with a source, for example, a person of people 141. In some embodiments, aggregator 123 may aggregate categories of a subset of content instances associated with a source, for example, a person of people 141. For example, a content creator's playlist of video content instances can be considered a subset of content instances. Aggregator 123 may determine a subset of content instances based on pre-existing groups or may automatically determine based on the context similarity of content instances. For example, a subset of video content instances related to travel from a content creator can be one subset, and a group associated with food can be part of a second subset of content instances. In some embodiments, aggregator 123 may aggregate categories of content instances as part of different groups of content instances.

In some embodiments, aggregator 123 may aggregate categories associated with a source, such as a person of people 141 using a second set of categories. Aggregator 123 may generate groups of categories with keywords of the cleaned information. Aggregator 123 may aggregate categories by parsing cleaned information associated with content instances in content 142 by grouping keywords identified in cleaned information. Aggregator 123 may group keywords tokenized by tokenizer 122 using cleaned information from extractor 111. Aggregator 123 may aggregate the tokenized keywords in three steps.

In step 1, aggregator 123 may generate embeddings of keywords 131 of cleaned information 143 grouped into a category based on context similarity and semantic similarity. Aggregator 123 may determine context similarity based on a first instance of content 142 and a second instance of content 142 associated with a source, such as a person in people 141. In some embodiments, aggregator 123 may determine context similarity based on the similarity of a first person of people 141 associated with cleaned information 143 and a second person in people 141 associated with cleaned information 143.

In step 2, aggregator 123 may aggregate nearest-k embeddings of embeddings from step 1 into a single embedding representing a group. In step 3, aggregator 123 may extract features for each category using a term frequency-inverse documentary frequency measure. A detailed description of these steps and the transformation of data in content instances in content 142 is described in FIGS. 5 and 6 descriptions below.

Categorization module 120 may determine a third set of categories to apply to a content instance in content 142. In one example, categorization module 120 may determine a third set of categories of information (e.g., information 143) associated with a group of content instances of content 142, including instances in content 142 used in identifying first and second sets of categories. The group of instances in content 142 may be associated with a source, for example, a person of people 141. The third set of categories may include the person associated with a content instance in content 142 to be categorized. In some embodiments, information 143 may include the information associated with an individual associated with a content instance to be categorized.

Measurer 113 may categorize content for use by other systems by generating metadata 133 for content associated with people 141 representing multiple sets of categories 132 of information. Measurer 113 may generate metadata 133 by determining frequency data associated with the information based on the first set of categories, the second set of categories, and the third set of categories generated using categorization module 120.

Measurer 113 may measure the keywords within a category in categories 132 to generate metadata 133 to add to mining repository 130. Measurer 113 may make a statistical measurement of the prevalence of a keyword within a category. For example, measurer 113 may measure the average number of words between two instances of the same keyword. In some embodiments, measurer 113 measures the keyword prevalence across content 142. Measurer 113 may use term frequency/inverse document frequency measure to measure the prevalence of a keyword. Measurer 113 may additionally use the usage frequency of a keyword with content instances associated with a person of people 141. In some embodiments, measurer 113 may also use keyword frequency within an entire medium (e.g., content 142) to calculate the prevalence of a keyword in a category.

Measurer 113 may process keywords 131 before generating prevalence measures of keywords 131. Measurer 113 may process keywords 131 by deleting keywords. Measurer 113 may determine the keywords to delete based on their usability. Measurer 113 may delete keywords with low usability from keywords 131. Measurer 113 may determine the low usability of a keyword based on the relevance of content 142. In some embodiments, measurer 113 may perform a preprocessing step of frequency analysis of a keyword in a category and across all categories 132 of content 142. Simple frequency analysis may include counting the number of times a keyword appears in textual data in information 143 of content instances of content 142.

Measurer 113 may also measure context similarity by comparing the similarity of keywords across categories 132. Measurer 113 may compare keywords 131 for similarity across various categories associated with a single instance in content 142, across a group of content instances grouped by a person in people 141, or automatically based on context or semantic similarity. In some embodiments, measurer 113 may also measure similar keywords across categories associated with entire content 142. Measurer 113 may embed a measure of keyword similarity comparison into metadata 133 associated with content 142.

Categorization engine 101 may utilize its components described above with various components of mining repository 130 and content repository 140 to generate and manage categories 132 in mining repository 130 accessed by user device 170. In various embodiments, mining repository 130 and content repository 140 may take several different forms.

For example, mining repository 130 may be an SQL database or NoSQL database, such as those developed by MICROSOFT™, REDIS, ORACLE™, CASSANDRA, MYSQL, or various other types of databases. According to such database techniques, data may be returned by calling a web service, by calling a computational function, from sensors, from IoT devices, or from various other data sources. Mining repository 130 may store data that is used or generated during the operation of applications, such as categorization engine 101 or its components. For example, if categorization engine 101 is configured to generate data to use categorized data, such as keywords 131, mining repository 130 may store the generated data when content 142 is classified in categories 132.

Content 142 may be in various formats, including multimedia and textual content. The source of content 142 may be pre-recorded data or a live multimedia stream. For example, content 142 could be a video stream from a camera transmitted live and not recorded to a storage device. Content 142 may include additional information describing each instance. The additional information may include the title, description, and content classification using tags.

Data processing module 110 may process content 142 by extracting information 143 and using it to classify instances in content 142. Information extracted from an instance in content 142 may include a representation of a content instance in textual format. For example, system 100 may review video or audio content and extract human speech in textual format. In some embodiments, information may include data describing the content. For example, data processing module 110 may take as input video content of a security camera and extract information describing various events such as detected motion or arrival and exit of a person in a camera's view. In some embodiments, information 143 may include one or more keywords or a user-generated content classification. In some embodiments, information extracted from an instance in content 142 may include a representation of a content instance in visual format.

Categorization engine 101 may use ML module 150 to train one or more machine learning models to infer one or more classifications associated with content creators. ML module 150 may retrieve and process data to use as input to one or more machine learning models 152 to infer categories 132 or classifications not in categories 132 to associate with people 141. ML module 150 may also retrieve and process outputs of data processing module 110 or categorization module 120 to infer one or more classifications associated with people 141. As illustrated in FIG. 1, ML module 150 may include ML classifier 151, ML model(s) 152 and ML model trainer 153. Those components may retrieve and transform data from content repository 140 and mining repository 130 to train one or more ML models to infer one or more classifications associated with content creators (e.g., people 141). ML classifier 151 may perform steps for inferring one or more classifications using ML model(s) 152. ML model trainer 153 may perform steps for training ML model(s) 152.

ML module 150 may retrieve data from at least one of content repository 140 or mining repository 130 to gather input data. In some embodiments, retrieved data may comprise a plurality of content datasets, wherein each content dataset of the plurality of content datasets is associated with a person of people 141. For example, each content dataset may include a group of content instances associated with the person, metadata associated with the person, metadata associated with the group of content instances associated with the person, and one or more categories associated with the content dataset. Additionally or alternatively, retrieved data may include one or more of keywords 131, categories 132, metadata 133, people 141, content 142, information 143 or labeled data 134 from content repository 140 and mining repository 130. Labeled data 134 may include prelabeled data. For example, labeled data may include manually labeled data associated with any data stored in mining repository 130 or content repository 140. In some embodiments, ML module 150 may retrieve data within updated content repository 140 and updated mining repository 130, wherein at least one of repositories 130 or 140 may be updated based on one or more outputs of categorization engine 101. ML module 150 may employ at least one of ML classifier 151 or ML model trainer 153 to gather and prepare data for performing at least one of training ML Model(s) 152 or inferring one or more classifications for one or more content creators.

ML classifier 151 and ML model trainer 153 may help with classification by gathering one or more input datasets. ML classifier 151 may gather one or more input datasets associated with a single content creator (e.g., person of people 141). ML model trainer 153 may gather one or more input datasets associated with a plurality of content creators (e.g., multiple people of people 141). In some embodiments, each input dataset may comprise a subset of data stored in at least one of mining repository 130 or content repository 140. For example, an input dataset may include at least a subset of one or more of content (e.g., content 142), information (e.g., information 143), keywords (e.g., keywords 131), categories (e.g., categories 132), metadata (e.g., metadata 133), or labeled data 134 associated with one or more people of people 141.

ML classifier 151 and ML model trainer 153 may preprocess the input datasets by cleaning the input datasets. In some embodiments, cleaning the input datasets may include resolving at least one of grammatical or typographical errors. In some embodiments, cleaning the input datasets may include identifying and removing removeable data from the input datasets. For example, removeable data may comprise at least one of corrupted or irrelevant data. In some embodiments, cleaning the input datasets may include modifying at least one of a resolution or format of one or more subsets of the input datasets. In some embodiments, cleaning the input datasets may include removing one or more stop words or one or more common words from a corpus of keywords (e.g., keywords 131) associated with content. In some embodiments, ML module 150 may be configured to perform one or more computer vision analysis techniques.

ML classifier 151 and ML model trainer 153 may preprocess the input datasets by aggregating all input data associated with one or more content creators and dividing the aggregated input data. For example, ML classifier 151 may aggregate all input data associated with a single content creator and divide the aggregated input data into a plurality of subsets. ML model trainer 153 may, for each content creator of a plurality of content creators, aggregate all input data associated with the content creator and divide the aggregated input data into a plurality of subsets. In some embodiments, ML classifier 151 and ML model trainer 153 may divide the aggregated input data based on determining that aggregated input data exceeds a predetermined threshold size. Based on the determination, ML classifier 151 and ML model trainer 153 may divide aggregated input data into a plurality of subsets. In some embodiments, ML classifier 151 and ML model trainer 153 may divide each input dataset into no more than a predetermined number of subsets.

ML classifier 151 and ML model trainer 153 may preprocess the input datasets by normalizing the input datasets. In some embodiments, normalizing the input datasets may include performing character encoding to encode all text in the input datasets into a consistent character encoding format. Additionally or alternatively, normalizing the input datasets may include tokenizing text in the input datasets by splitting the text into one or more single words or short sentences. In some embodiments, categorization engine 101 may include one or more language-specific tokenizers to identify language-specific word boundaries. In some embodiments, normalizing the input datasets may include converting all text in the input datasets to lowercase. Additionally or alternatively, normalizing the input datasets may include removing one or more punctuation marks and special characters from text in the input datasets. Additionally or alternatively, normalizing the input datasets may include removing one or more stop words from the corpus of keywords. Additionally or alternatively, normalizing the input datasets may include removing one or more common words from the corpus of keywords. Additionally or alternatively, normalizing the input datasets may include performing one or more natural language processing (NLP) techniques, such as stemming or lemmatization.

ML module 150 may be configured to identify one or more languages associated with the input datasets. Identifying one or more languages may include at least one of analyzing character n-grams, identifying unique characters, or using one or more language models to identify the one or more languages. In some embodiments, ML module 150 may be configured to normalize the input datasets by standardizing the input datasets to a common language. For example, when module 150 identifies that the input datasets include text in different scripts, ML module 150 may perform transliteration to convert the text of the input datasets to a common script. Alternatively, when ML module 150 identifies that the input datasets include text in different human languages, ML module 150 may perform language-specific processing steps. In some embodiments, language-specific processing steps may include at least one of tokenization, stemming, lemmatization, or any other NLP technique specific to a language. In some embodiments, ML module 150 may normalize the input datasets by translating the input datasets to a common language. In some embodiments, ML module 150 may normalize each input dataset of the input datasets by assigning one or more tags based on a language associated with the input dataset.

ML module 150 may implement multilingual word embeddings to capture cross-lingual semantic information from the input datasets. In some embodiments, ML module 150 may retrieve multilingual word embeddings from a database external to system 100 (not pictured), such as via network 180. In some embodiments, one or more components of categorization engine 101 may generate multilingual word embeddings.

ML module 150 may normalize the input datasets by vectorizing the input datasets to a common vector space. For example, ML module 150 may perform feature extraction to convert the input datasets into numerical features that can be represented as feature vectors. In some embodiments, feature extraction may comprise converting text of the input datasets into word embeddings. For example, feature extraction may comprise using at least one of Word2Vec, FastText, or BERT to convert text into word embeddings. In some embodiments, feature extraction may comprise converting images of the input datasets into vectors. For example, feature extraction may comprise using at least one convolutional neural network (CNN) or pre-trained image embeddings to convert images into vectors. In some embodiments, ML module 150 may normalize the feature vectors to a consistent scale. In some embodiments, ML module 150 may map the normalized feature vectors into a common vector space. In some embodiments, ML module 150 may perform at least one of alignment or transformation on the mapped feature vectors. ML module 150 may enrich the normalized input datasets with other retrieved data. Other retrieved data may include any combination of data from mining repository 130 or content repository 140, such as information 143, metadata 133, person metadata received from each person of people 141 (e.g., location, content format, contextual information), one or more keywords of keywords 131, or one or more categories of categories 132. In some embodiments, ML module 150 may normalize the other retrieved data by vectorizing the other retrieved data to a common vector space. In some embodiments, enriching the normalized input datasets may include concatenating vectorized input datasets with vectorized other retrieved data. In some embodiments, enriching the other retrieved data may include fusing vectorized input datasets with vectorized other retrieved data. In some embodiments, enriching the normalized input datasets may include embedding other retrieved data into the normalized input datasets.

ML module 150 may tokenize the normalized and enriched input datasets. In some embodiments, ML module 150 may tokenize the normalized and enriched input datasets based on semantic context. For example, ML module 150 may utilize a domain-specific encoder architecture to tokenize the input datasets such that each token captures underlying semantic content of the data. In some embodiments, the domain-specific encoder architecture may comprise a deep learning model trained to transform input datasets into tokens based on semantic context. ML classifier 151 may input one or more tokenized input datasets into ML model(s) 152 to infer one or more classifications associated with a content creator.

ML model(s) 152 may comprise one or more machine learning models. In some embodiments, ML model(s) 152 may comprise a monolithic system. In some embodiments, ML model(s) 152 may comprise a distributed system. A detailed description of inferring one or more classifications using ML model(s) is provided in FIG. 15 description below.

ML model trainer 153 may perform filtering. Filtering may include grouping tokens. For example, ML model trainer 153 may group tokens to prepare machine learning model training data. In some embodiments, ML model trainer 153 may group tokens based on context specific categories. In some embodiments, ML model trainer 153 may group tokens of different content creators based on contextual similarities. For example, ML model trainer 153 may determine contextual similarities between tokens. In some embodiments, using the determined contextual similarities, ML model trainer 153 may group tokens by grouping two or more tokens that are within a threshold contextual similarity. For example, ML model trainer 153 may group a first token associated with a first person, a second token associated with a second person, and a third token associated with a third person after determining that they are within a threshold distance of one another in the continuous vector space. In some embodiments, ML model trainer 153 may dynamically determine the threshold contextual similarity for grouping tokens. For example, ML model trainer 153 may execute a maximization function to determine an optimal threshold.

ML model trainer 153 may perform labeling. ML model trainer 153 may identify tokens with strong labels. In some embodiments, ML model trainer 153 may generate weak labels by performing label propagation to assign labels to unlabeled tokens based on strong labels. ML model trainer 153 may identify similar tokens using similarity measurements. In some embodiments, ML model trainer 153 may identify similar tokens based on context metadata. For example, ML model trainer 153 may identify similar tokens based on creator metadata to identify tokens associated with similar content creators. An example of filtering and labeling is described with respect to FIG. 14 below.

ML model trainer 153 may batch labels from the same content creator into a single batch for training ML model(s) 152. ML trainer 153 may batch labels for each content creator to output a plurality of batches, each batch associated with a content creator.

Network 180 may take various forms. For example, the network 180 may include or utilize the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or other types of network communications. In some embodiments, network 180 may include an on-premises (e.g., LAN) network, while in other embodiments, network 180 may include a virtualized (e.g., AWS™, Azure™, IBM Cloud™, etc.) network. Further, network 180 may in some embodiments, be a hybrid on-premises or fully virtualized network, including components of both types of network architecture.

Figure 2:
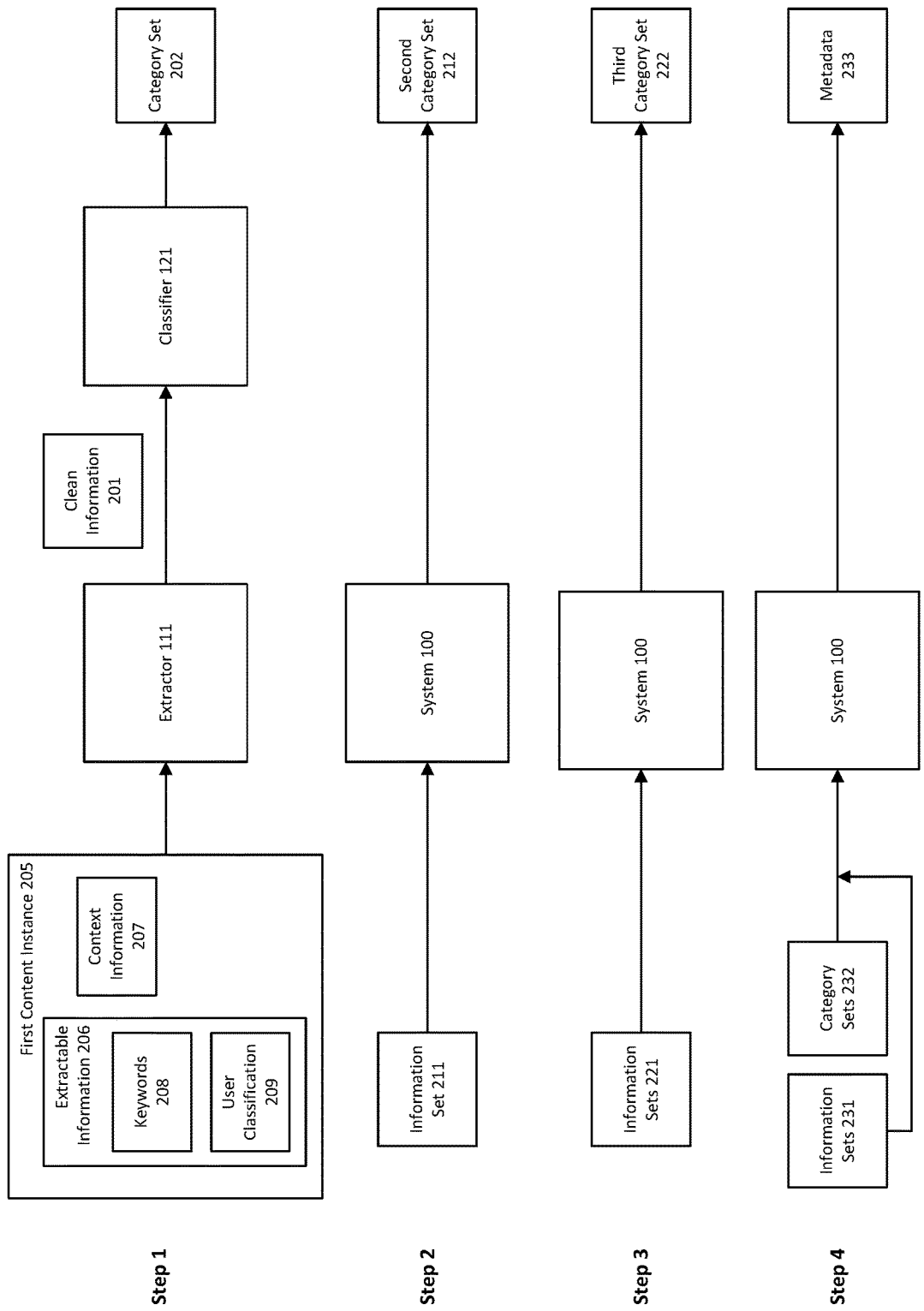
FIG. 2 is a flow diagram illustrating an exemplary transformation from input content to generate categorization data, according to some embodiments of the present disclosure.

FIG. 2 is a flow diagram illustrating an exemplary transformation from input content to generate categorization data, according to some embodiments of the present disclosure. As illustrated in FIG. 2, system 100 transforms input at each step of steps 1 to 4 to generate category sets of categorization data to classify the first content instance 205.

In step 1, components of system 100, such as extractor 111 and classifier 121 transform first content instance 205 to generate category set 202. First content instance 205 may include extractable information 206 and context information 207 used in generating category sets and aggregating categories. Category set 202 may include categories assigned to groups of keywords identified in the first content instance 205. Extractor 111 and classifier 121 in identifying and grouping keywords into categories in category set 202.

Extractor 111 may retrieve extractable information 206 and transform it into clean information 201. Extractor 111 may transform extractable information 206 by removing common and stop words. Classifier 121 may take as input clean information 201 to generate category set 202 of various keywords in clean information 201. Clean information 201 may be stored as information 143 (as shown in FIG. 1) in content repository 140. A detailed description of various sub-steps in generating category set 202 is provided in FIG. 5 description below.

As illustrated in FIG. 2 steps 2-3, system 100 processes information set 211 and information sets 221 extracted from multiple instances in content 142, including first content instance 205 to generate second category set 212 and third category set 222. System 100 may provide additional categorization data for the first content instance 204 by generating a second category set 212 to a group of content instances, including the first content instance 205. System 100 may use user classification 209 and context information 207 to identify keywords in keywords 131 to identify contextually similar content instances in content 142 to generate and assign the second category set 212. System 100 may use information set 211 from contextually similar content instances to generate second category set 212. Information set 211 may include clean information (e.g., clean information 201) extracted from each of the contextually similar content instances, including first content instance 205. A detailed description of various sub-steps in generating second category set 212 is provided in FIG. 6 below.

In step 3, system 100 may include information sets 221, including information set 211, and other sets of information from information 143. System 100 may generate third category set 222 by grouping keywords for all content instances in content 142 using information sets 221. System 100 may group keywords by removing low usability keywords and categorizing the remaining keywords to generate third category set 222. A detailed description of various sub-steps in generating third category set 222 is provided in FIG. 11 description below.

As a final step of generating categorizing data, system 100 in step 4 takes as input all available information sets 231 and category sets 232 generated in steps 1-3 to generate metadata 233 to associate with first content instance 205. A detailed description of a method to generate metadata 233 is provided in FIG. 11 description below.

Figure 3:
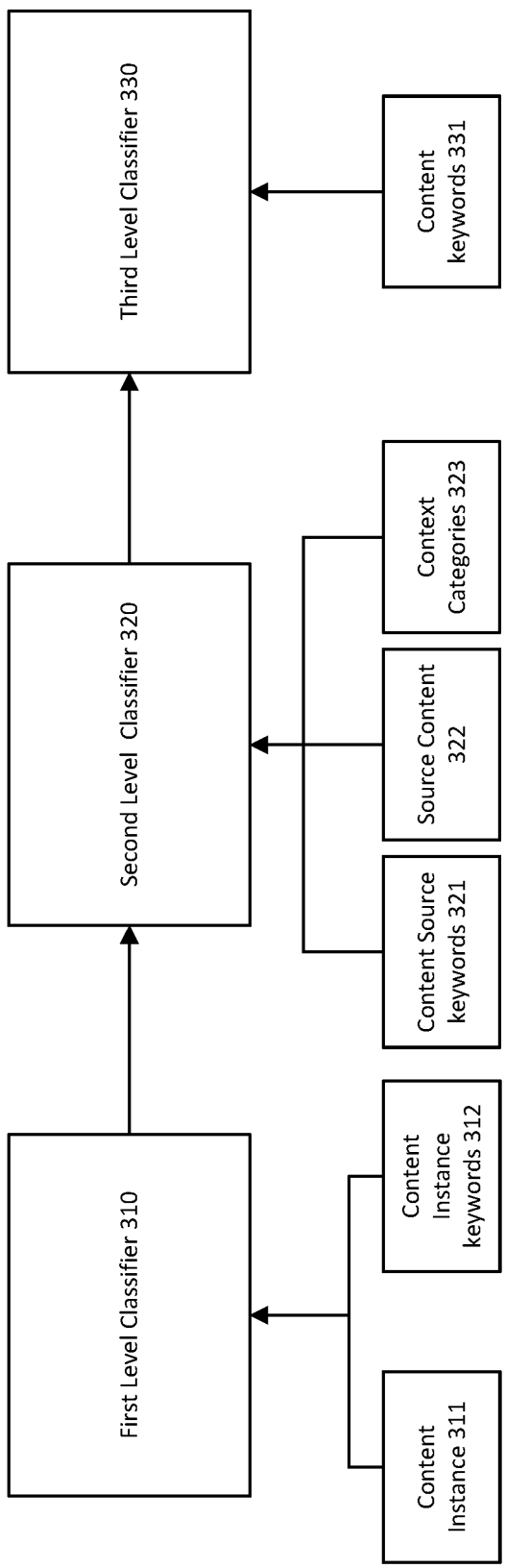
FIG. 3 illustrates a schematic diagram of an exemplary multi-level data classification, according to some embodiments of the present disclosure.

FIG. 3 illustrates a schematic diagram of an exemplary multi-level data classification, according to some embodiments of the present disclosure. As illustrated in FIG. 3, classifiers 310, 320, and 330 are used to classify each content instance of content 142 (as shown in FIG. 1) by providing each classifier input to the next classifier. First level classifier 310 takes as input content instance 311 and content instance keywords 312 to generate categories to associate with content instance 311. First level classifier 310 may process each content instance in content 142 to generate categories of keywords to associate with each content instance. First level classifier 310 may review content instance keywords 312 assigned by a content instance source, for example, a creator of content instance 311. Content instance keywords 312 may be tags to assign to content instance 311. In some embodiments, content instance keywords 312 may include additional metadata such as title and description, providing contextual information of content instance 311. First level classifier 310 may determine additional keywords by processing data in content instance 311. Data in content instance 311 may include textual data of human speech in content instance 311. In some embodiments, content instance 311 is formatted as text data, such as an article, or may be external to content instance 311, such as a subtitles file associated with a content instance. First level classifier 310 may process the identified and extracted textual data to generate additional keywords (e.g., keywords 131 of FIG. 1) to associate with content instance 311. First level classifier 310 may further process keywords to determine categories to associate with content instance 311.

Second level classifier 320 may help further classify content instance 311 by associating categories of keywords to a group of content instances in content 142. Second level classifier 320 may group content instances by context similarity. Second level classifier 320 may consider content instances in content 142 associated with one source, for example, the same creator, to be contextually similar. In some embodiments, second level classifier 320 may consider content instances associated with similar sources to be contextually similar. Second level classifier 320 may take as input content source keywords 321 and source content 322 to determine contextually similar content instances. Second level classifier 320 may also take as input context categories 323 associated with contextually similar content instances in content 142. Context categories may be categories of categories 132 (as shown in FIG. 1) associated with each content instance as determined by first level classifier 310. Second level classifier 320 may aggregate content source keywords 321 and context categories 323 to determine a set of categories to assign to all content instances in source content 322, including content instance 311.

Third level classifier 330 may classify content instance 311 by associating categories of keywords to all content instances in content 142. Third level classifier 330 may take as input content keywords 331 associated with all content instances in content 142. Third level classifier 330 may determine a subset of keywords of content keywords 331 to determine aggregated categories to assign to all content instances in content 142, including content instance 311. Third level classifier 330 may determine a subset of keywords of content keywords 331 by generating metadata (e.g., metadata 133 of FIG. 1) to associate with all content instances. Metadata 133 may determine prevalence of each keyword across all content instances. Third level classifier 330 may use the prevalence information about each keyword to filter the most prevalent keywords. Third level classifier 330 may determine keyword prevalence using statistical techniques such as term frequency/inverse document frequency (TF/IDF).

Figure 4:
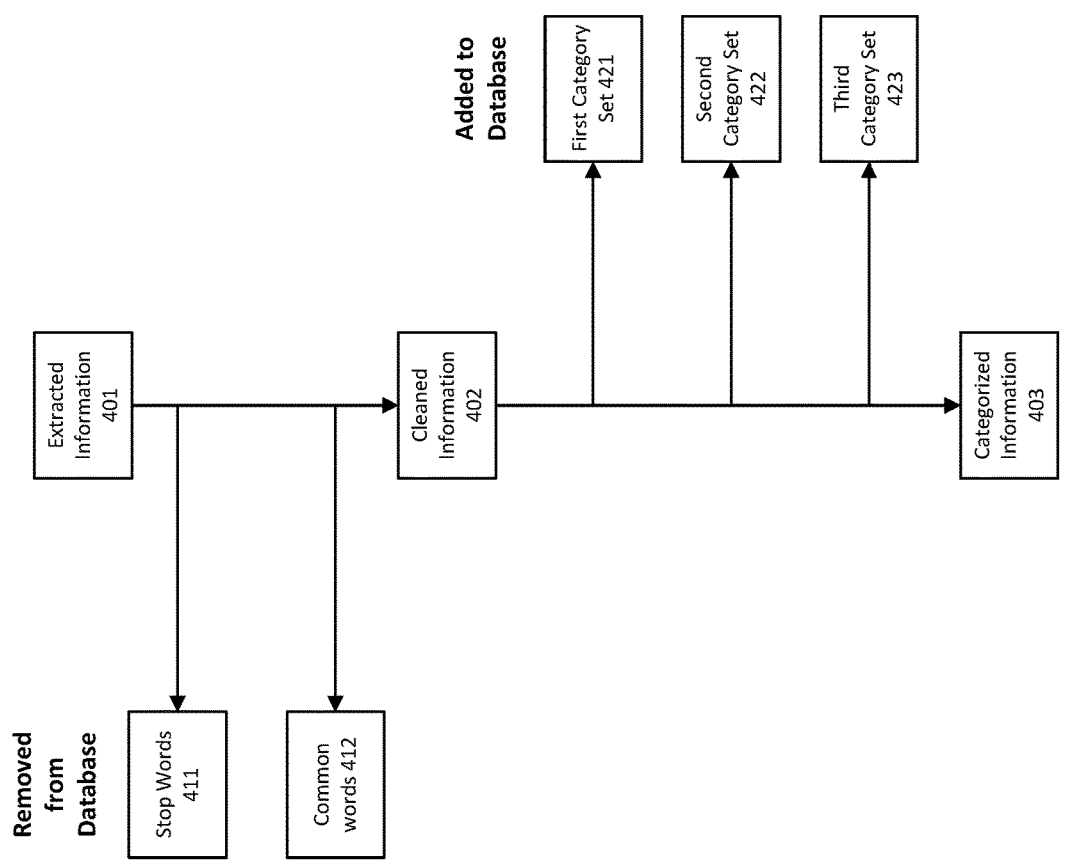
FIG. 4. is a flow diagram showing various, exemplary database updates performed using a data categorization system, according to some embodiments of the present disclosure.

FIG. 4. is a flow diagram showing various, exemplary database updates performed using a data categorization system, according to some embodiments of the present disclosure. As illustrated in FIG. 4, database updates include adding new data in form categories 132 to associate an instance of content 142 (as shown in FIG. 1) and removing existing data forming a corpus of keywords 131, such as stop words 411 and common words 412. As part of updating data, system 100 may also transform information 143 associated with an instance of content 142 by first extracting information 401, such as textual data in a content instance. For example, extracted information 401 may include a textual representation of audio in a content instance or a description of visual data in a content instance. System 100 may clean the extracted information 401 to generate clean information 402. System 100 may transform extracted information 401 to clean information 403 by removing stop words 411 and common words 412. System 100 may use clean information 402 to generate categorized information by generating category sets 421-423 and associating with each content instance of content 142. System 100 may store generated category sets 421-423 and information 403 in a database (e.g., mining repository 130 of FIG. 1) and associate with instances of content 142.

Figure 5:
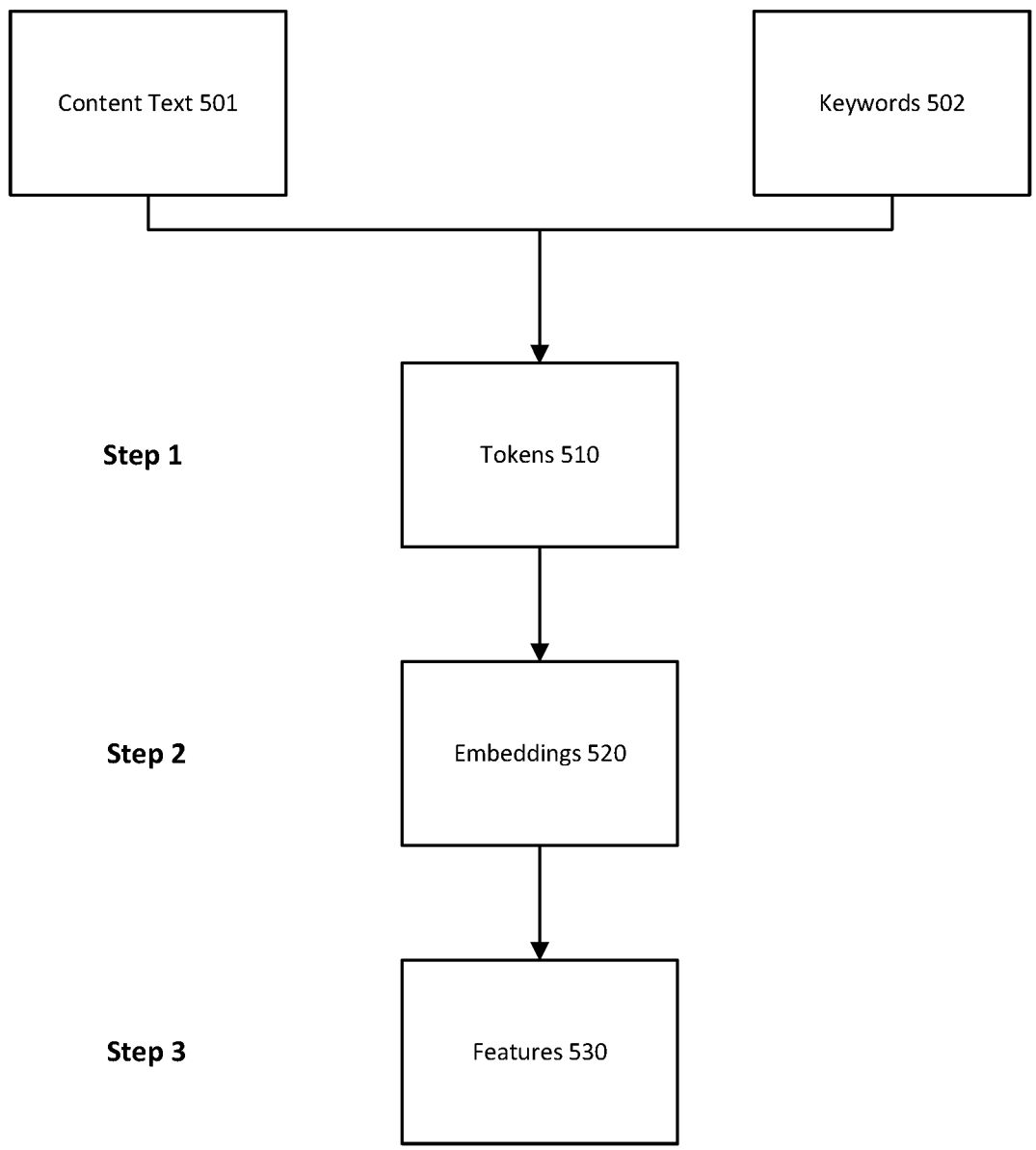
FIG. 5 is a flow diagram of exemplary steps for generating first level of classification according to some embodiments of the present disclosure.

FIG. 5 is a flow diagram of exemplary steps for generating first level of classification according to some embodiments of the present disclosure. As illustrated in FIG. 5, system 100 may generate first level of classification represented by a first category set (e.g., category set 202 of FIG. 2) by taking as input content text 501 associated with a content instance in content 142 (as shown in FIG. 1) and keywords 502 of keywords 131 associated with the same instance of content 142. In some embodiments, keywords 502 is an empty set. For example, a content instance in content 142 may not be tagged with any keywords that are represented as keywords 502. System 100 may extract content text 501 from a content instance in content 142, such as converting speech in an audio content instance. System 100 may use content text 501 and keywords 502 associated with a content instance in content 142 to generate first level of classification in three steps.

In step 1, system 100 may tokenize keywords in a sentence in content text 501 from a content instance in content 142. In some embodiments, tokenizer 122 may help tokenize a short sentence into a token or may select individual words as a separate token. Tokens 510 may be identified by simply identifying spaces between words and separating them into individual tokens. Tokenizer 122 may include start and stop tokens to a sentence of words. In some embodiments, tokenizer 122 may utilize a corpus of tokens associated with a user associated with instances of content 142.

In step 2, the tokenized keywords (e.g., tokens 510) from step 1 are used to generate embeddings 520. An embedding may be a vector of other words that can be associated with the token representation of a word. Embeddings 520 of tokens 510 from step may be determined based on semantic similarity. In some embodiments, embedding vectors of tokenized keywords from step 1 may be generated based on context similarity with a previously determined keyword. For example, an embedding vector of a tokenized keyword "San Francisco" can be a vector of keywords "{SF, Bay Area, Northern California, California}" with a similar context of a location. In some embodiments, embedding vector is associated with a person in people 141. For example, a person can be an author of content instance in content 142 associated with tokenized keywords, and an embedding vector includes tokenized keyword concatenated with the author's information.

Embedding techniques may include statistical methods such as bag of words model, n-gram, term frequency-inverse document frequency. These techniques may create a simple vector of the number of times a word is repeated in a sentence or an input set of sentences, the position of each keyword in the sentence or set of sentences, and other details.

In step 3, features 530 may be extracted from the words in a sentence in content text 501. Embedding vectors from step 2 may be used in extracting features. One feature of the features 530 could be the most repeated words in an instance of content 142. As common words such as "a/an" or "the" could end up being the most frequent words, a preprocessing step of cleaning common words may help such words not to be considered as the most frequent words as part of the feature extraction. In some embodiments, a bag of words model may be employed to extract features 530. Other methods of extracting features 530 include the n-gram model.

Categorization module 120 of FIG. 1 may use the extracted features 530 to determine the subset of keywords to classify an instance in content 142 into a category. In some embodiments, the classification may result in multiple categories of categories 132 associated with an instance in content 142. In some embodiments, categorization module 120 may make multiple subsets of keywords based on extracted features 530 and classify them into multiple categories of categories 132. In some embodiments, the subsets of keywords associated with different categories of categories 132 may overlap with common ones between subsets. In some embodiments, overlapping categories of categories 132 may be related and organized hierarchically.

Categorization module may use embeddings 520 and features 530 to classify keywords 502 into categories of categories 132 based on the existing structure of content 142. If a content instance in content 142 contains pre-classification at a macro level, for example, classifications selected when a content instance is uploaded to a platform containing content 142, then such classifications can be used as initial buckets and updated with new or additional classifications based on embeddings 520 and features 530.

If content instance in content 142 does not contain pre-classification, categorization module 120 may use as a mapping method based on a basic corpus of keywords 502 used to generate basic categories. Categorization module 102 may improve basic categories through different levels of classification.

Categorization module 120 may generate basic categories for a corpus of keywords 502 by mapping all content 142 to specific categories by relating data and metadata 133 to certain categories. Keywords of keywords 502 that are not associated previously with any category in categories 132 are grouped into relevant categories through a further processes. If categories 132 is an empty set, for example, when categorizing content 142 for the first time, categorization module 120 may group keywords 502 into a graph by calculating distances. Categorization module 120 may use nearest k-embeddings of embeddings 520 to group keywords 502 into k unnamed categories. Categorization module 120 may access metadata in metadata 133 associated with keywords 502 within each unnamed category to assign names to categories.

Figure 6:
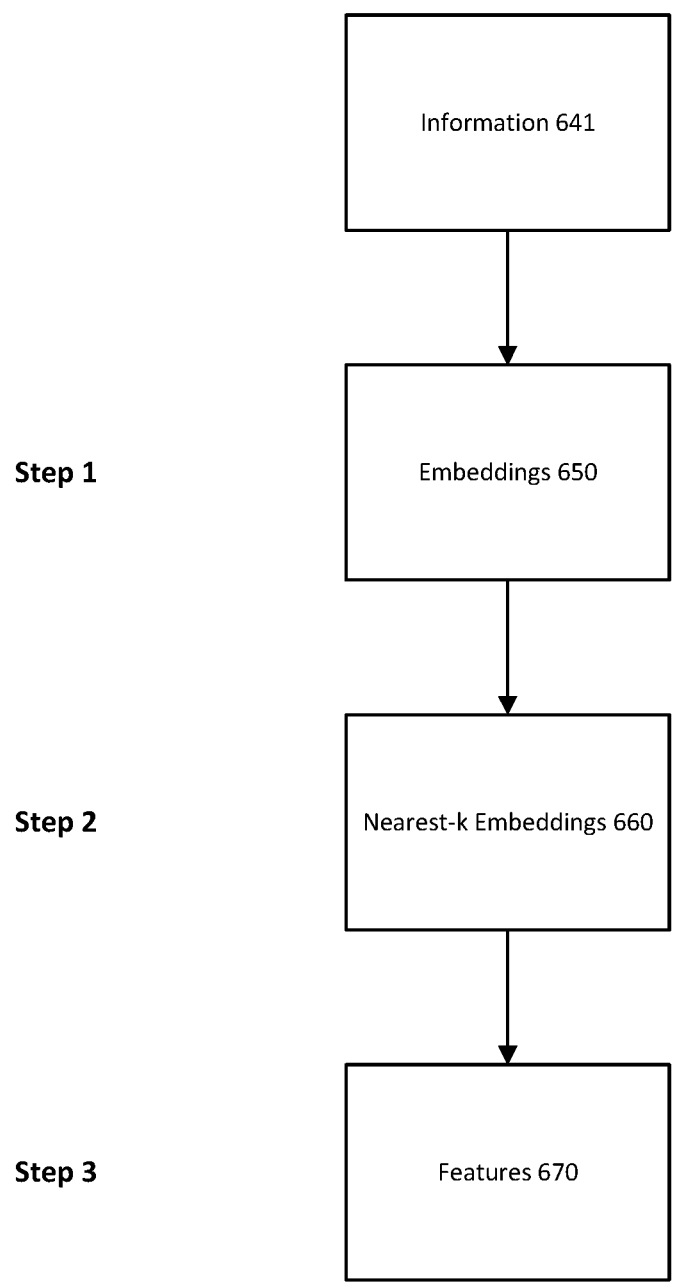
FIG. 6 is a flow diagram of exemplary steps for generating second level of classification according to some embodiments of the present disclosure.

FIG. 6 is a flow diagram of exemplary steps for generating second level of classification according to some embodiments of the present disclosure. As illustrated in FIG. 6, system 100 may generate second level of classification represented by a second category set (e.g., second category set 212 of FIG. 2) by transforming information 641 from a set of instances in content 142 into embeddings 650 and extracting features 670. System 100 may use information 641 to generate second level of classification in three steps.

In step 1, information 641 is transformed into embeddings 650. Information 641 is transformed based on the categories (e.g., category set 202 of FIG. 2) assigned to each instance of content 142 as determined in step 1 of FIG. 2 and FIG. 5. Transformation of information 641 includes transformation of keywords obtained from information 641 into embeddings 650. System 100 may select for transformation keywords associated with a category of category set (e.g., category set 202 of FIG. 2). System 100 may select keywords associated with multiple content instances grouped under a matching category. System 100 may select a matching category associated with a set of content instances filtered based on context similarity. Content instances in content 142 may have similar contexts when they are associated with the same person of people 141. For example, content instances authored by the same author can be considered to have similar contexts. In some embodiments, system 100 may consider content instances in content 142 associated with similar people of people 141 to have similar contexts. In some embodiments, system 100 may select content instances in content 142 based on semantic similarity. System 100 may consider matching category associated with keywords obtained from contextually similar or semantically similar content instances and generate embeddings of keywords grouped by matching category.

Content instances may contain semantically similar data in the form of keywords extracted from content instances or tagged to content instances. Content instances may be considered to contain semantically similar data when words or phrases or sentences with same meaning are presented in a different manner. System 100 may identify semantic similarities of keywords of data extracted from content instances. Semantic similarity analysis of data in content instances allows categorizing multiple keywords that can reference the same thing such as the case with acronyms, shorthand, slang, implied meaning, or even more commonly, typos and human errors when it comes to spelling. System 100 can identify when multiple keywords refer to the same topic and group the keywords under the same category. This grouping of keywords based on semantic similarity disallows content instances from being properly categorized or split into multiple categories.

In some embodiments, words in content instance data that are presented in abbreviated, expanded, or semi-expanded form are considered semantically similar. For example, USA, America, United States, and United States of America are all considered equal and semantically equally and used interchangeably and can be part of same category. In some embodiments, words in content instance data may be ordered differently but have the same meaning and are considered semantically similar. For example, content "Spain vs Germany match" and "Germany vs Spain" will be considered semantically similar. In some embodiments, data in content instances may be considered to be semantically similar even with additions of words. For example, content data "Call of duty," "COD," "COD MW3," "Modern warfare 3," "COD gameplay," "COD tutorial" with additional words or replaced words or abbreviated words are all considered semantically similar.

In step 2, system 100 may select nearest-k embeddings 660 of embeddings 650 generated in step 1. Nearest-k embeddings are nearest to each other by distance in a graph representing each embedding using a node. System 100 may calculate the distance between embeddings based on context similarity or other common details. System 100 may aggregate nearest-k embeddings 660 into a single embedding representing a set of content instances with matching categories identified in step 1.

In step 3, system 100 may extract features 670 from each category of a set of categories (e.g., category set 202 of FIG. 2) associated with information 641. System 100 may use combined embeddings from step 2 associated with a set of categories to extract features. System 100 may extract features 670 based on the most frequent keywords in embeddings determined using a term frequency-inverse document frequency method. In some methods, statistical techniques used in step 1 for generating embeddings may be used again for feature extraction in step 3. System 100 may group keywords from different categories based on extracted features. For example, system 100 may use a feature identifying keywords appearing together may be used to identify keywords to include in a group. In another example, system 100 may use a feature identifying the most frequent keywords to include in a group. Grouped keywords may be associated with multiple content instances in content 142. In some embodiments, the content instances may be associated with different sources, for example, a set of people in people 141. System 100 may generate the second level of classification by generating a second category set (e.g., second category set 212 of FIG. 2) based on grouped keywords.

Figure 7:
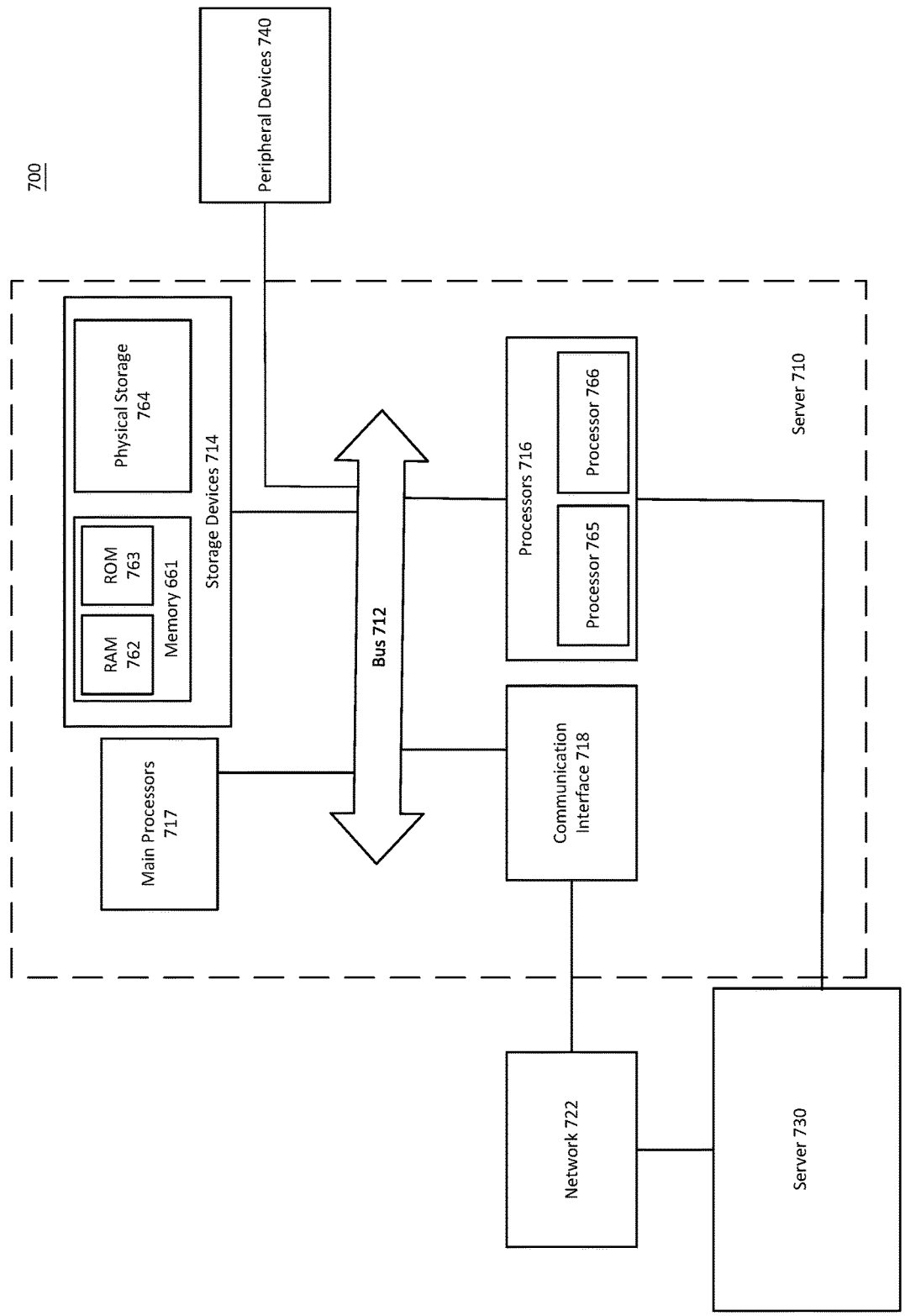
FIG. 7 illustrates a schematic diagram of an exemplary, distributed system, according to some embodiments of the present disclosure.

FIG. 7 illustrates a schematic diagram of an exemplary, distributed system, according to some embodiments of the present disclosure. According to FIG. 7, server 710 of distributed computing system 700 comprises a bus 712 or other communication mechanisms for communicating information, one or more processors 716 communicatively coupled with bus 712 for processing information, and one or more main processors 717 communicatively coupled with bus 712 for processing information. Processors 716 can be, for example, one or more microprocessors. In some embodiments, one or more processors 716 comprises processor 765 and processor 766, and processor 765 and processor 766 are connected via an inter-chip interconnect of an interconnect topology. Processors 716 and main processors 717 can be electronic devices capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), a neural processing unit (NPU), and any other type circuit capable of data processing. The processor may also be a virtual processor that includes one or more processors distributed across multiple machines or devices coupled via a network.

Server 710 can transmit data to or communicate with another server 730 through network 722. Network 722 can be a local network similar to network 180 (as shown in FIG. 1), an internet service provider, Internet, or any combination thereof. Communication interface 718 of server 710 is connected to network 722, which can enable communication with server 730. In addition, server 710 can be coupled via bus 712 to peripheral devices 740, which comprises displays (e.g., cathode ray tube (CRT), liquid crystal display (LCD), touch screen, etc.) and input devices (e.g., keyboard, mouse, soft keypad, etc.).

Server 710 can be implemented using customized hard-wired logic, one or more ASICs or FPGAs, firmware, or program logic that in combination with the server causes server 610 to be a special-purpose machine.

Server 710 further comprises storage devices 714, which may include memory 761 and physical storage 764 (e.g., hard drive, solid-state drive, etc.). Memory 761 may include random access memory (RAM) 662 and read-only memory (ROM) 763. Storage devices 714 can be communicatively coupled with processors 716 and main processors 717 via bus 712. Storage devices 714 may include a main memory, which can be used for storing temporary variables or other intermediate information during execution of instructions to be executed by processors 716 and main processors 717. Such instructions, after being stored in non-transitory storage media accessible to processors 716 and main processors 717, render server 710 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid] state drive, magnetic tape, or any other magnetic data storage medium, a CD-ROM, any other optical data storage medium, any physical medium with patterns of holes, a RAM, a PROM, and an EPROM, a FLASH-EPROM, NVRAM, flash memory, register, cache, any other memory chip or cartridge, and networked versions of the same.

Various forms of media can be involved in carrying one or more sequences of one or more instructions to processors 716 or main processors 717 for execution. For example, the instructions can initially be carried out on a magnetic disk or solid-state drive of a remote computer. The remote computer can load the instructions into its dynamic memory and send the instructions over a telephone line using a modem. A modem local to server 710 can receive the data on the telephone line and use an infrared transmitter to convert the data to an infrared signal. An infrared detector can receive the data carried in the infrared signal, and appropriate circuitry can place the data on bus 712. Bus 712 carries the data to the main memory within storage devices 714, from which processors 716 or main processors 717 retrieves and executes the instructions.

System 100 (as shown in FIG. 1) or one or more of its components may reside on either server 710 or 730 and may be executed by processors 716 or 717. In some embodiments, the components of system 100, data processing module 110, categorization module 120, and ML Module 150 may be spread across multiple servers 710 and 730. For example, data processing module 110 components 111-112 may be executed on multiple servers.

Figure 8:
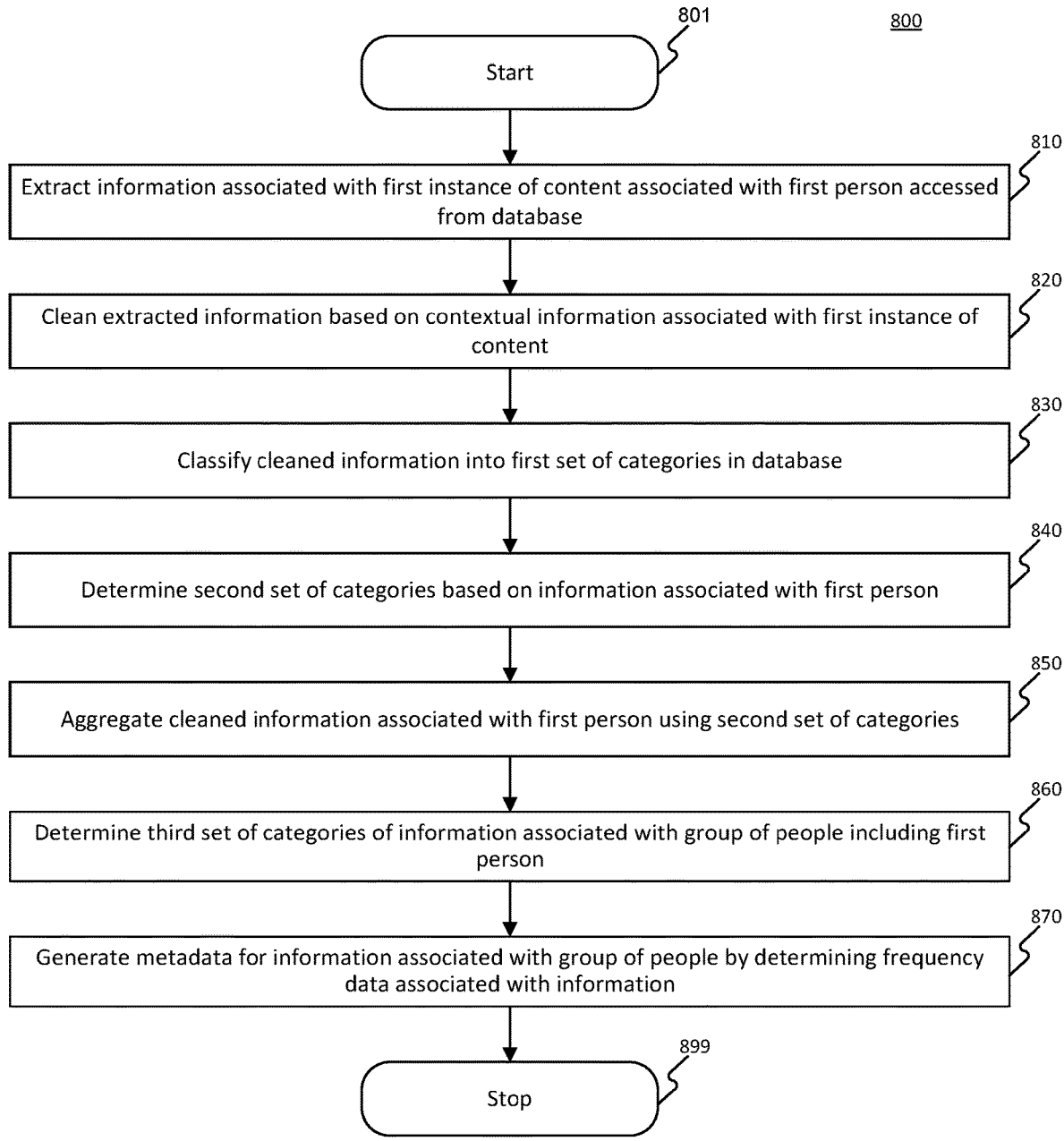
FIG. 8 is a flowchart illustrating an exemplary method for classifying content, according to some embodiments of the present disclosure.

FIG. 8 is a flowchart illustrating an exemplary method for classifying content, according to some embodiments of the present disclosure. The steps of method 800 may be performed by, for example, system 100 of FIG. 1 executing on or otherwise using the features of distributed computing system 700 of FIG. 7 for purposes of illustration. It is appreciated that the illustrated method 800 can be altered to modify the order of steps and to include additional steps.

In step 810, system 100 may extract information (e.g., information 143 of FIG. 1) associated with an instance of content 142 accessed from a database (e.g., content repository 140 of FIG. 1). System 100 may access and extract information from a content instance associated with a person of people 141 (as shown in FIG. 1). System 100 may extract information from an instance of content present in content repository 140 using an extractor (e.g., extractor 111 of FIG. 1). Extractor 111 may review a content instance of content 142 to extract information of information 143. Information extracted from a content instance of content 142 may include data within a content instance, for example, textual representation of speech in a video content instance. In some embodiments, information can include analysis of data of a content instance of content 142. For example, system 100 may analyze events in a video content instance, such as motion detection, to note the time of the event, the type of object whose motion was detected, and other event information, such as the time of previous motion event.

In step 820, system 100 may clean the extracted information obtained in step 810. System 100 may clean the information based on contextual information associated with the instance of content 142. Contextual information may include information used to calculate the relationship distance between words within the information associated with the instance of content 142.

In step 830, system 100 may classify cleaned information into a first set of categories in a database (e.g., content repository of FIG. 1). System 100 may classify cleaned information containing a keyword of keywords 131. System 100 may identify keywords by splitting words in cleaned information from step 820 into individual keywords.

In step 840, system 100 may determine a second set of categories (e.g., second category set 212 of FIG. 2) based on information associated with a first person of people 141 (as shown in FIG. 1). Second set of categories may be categories applied to an aggregate of the group of content instances associated with the first person. A detailed description of generating the second set of categories for second level of classification is provided in FIG. 6 description above. In step 850, system 100 may aggregate cleaned information (e.g., clean information 201 of FIG. 2) associated with the first person using second set of categories. System 100 may aggregate cleaned information by combining keywords of keywords 131 extracted from cleaned information of information extracted from content instances of content 142. System 100 may aggregate cleaned information of content instances with context similarity determined based on an associated person of people 141. For example, system 100 may consider content instances authored by the same person.

In step 860, system 100 may determine a third set of categories of information (e.g., information 143 of FIG. 1) associated with a group of people (e.g., people 141 of FIG. 1), including the first person. Third set of categories may be categories applied to groups of content, with each assigned a second set of categories generated in step 840. A detailed description of a method for generating the third set of categories for third level of classification is provided in FIG. 11 description below.

In step 870, system 100 may generate metadata 133 (as shown in FIG. 1) for information 143 (as shown in FIG. 1) associated with a group of people (e.g., people 141 of FIG. 1) by determining the frequency data associated with information 143. Frequency data may include frequency of keywords 131 forming categories 132 present in data in content instances in content 142. System 100, upon completion of step 870, completes (step 899) executing method 800 on distributed computing system 700.

Figure 9:
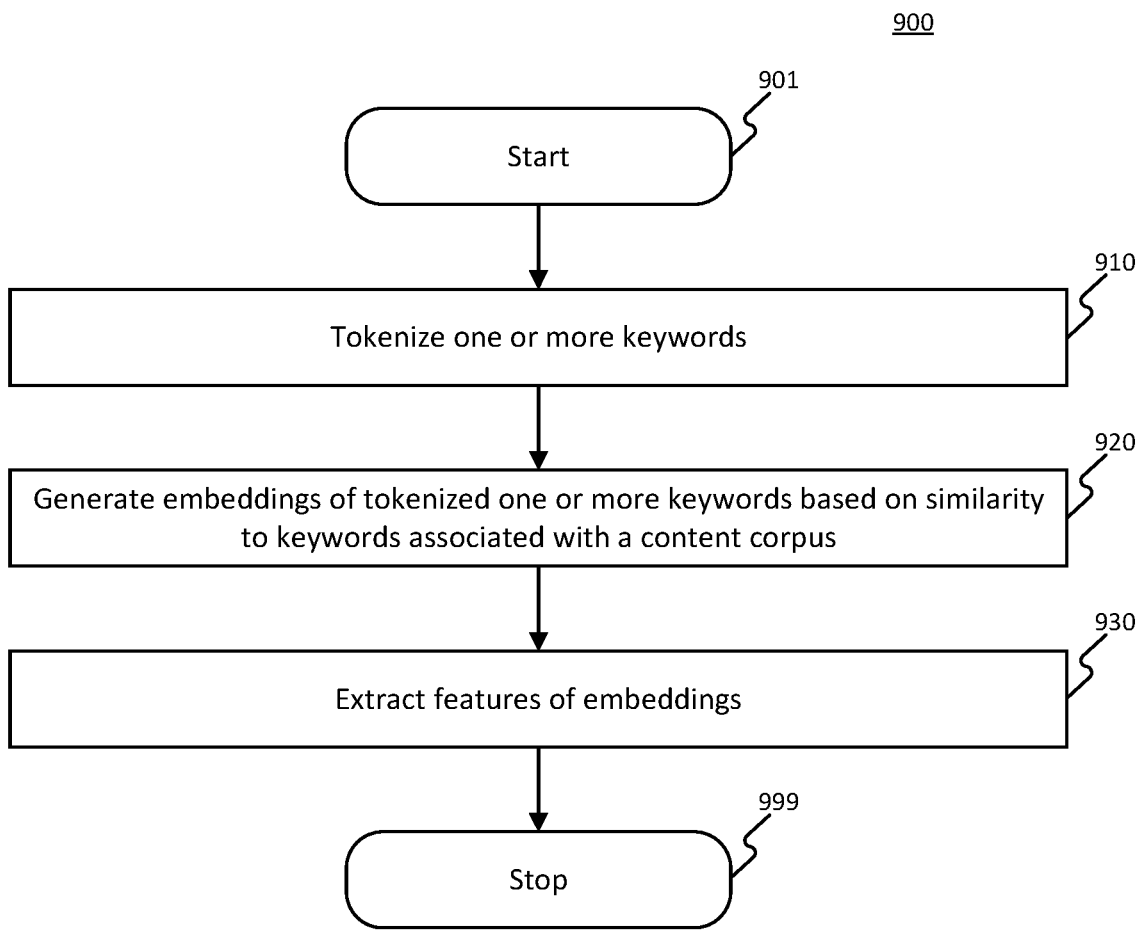
FIG. 9 is a flowchart illustrating an exemplary method for categorizing a content instance for content classification, according to some embodiments of the present disclosure.

FIG. 9 is a flowchart illustrating an exemplary method for categorizing a content instance for content classification, according to some embodiments of the present disclosure. The steps of method 900 may be performed by, for example, system 100 of FIG. 1 executing on or otherwise using the features of distributed computing system 700 of FIG. 7 for purposes of illustration. It is appreciated that the illustrated method 900 can be altered to modify the order of steps and to include additional steps.

In step 910, system 100 may tokenize keywords (e.g., keywords 131 of FIG. 1). System 100 may employ tokenizer 122 to generate tokenized keywords. System 100 may tokenize keywords 131 (as shown in FIG. 1) by retrieving and transforming keywords from data in content (e.g., content 142 of FIG. 1). For example, system 100 may obtain data in content 142 by applying speech-to-text transformation on audio in video content instances. Keywords 131 may include the formatted text of data retrieved from content 142. System 100 may generate keywords 131 by transforming data. For example, system 100 may split each word in text data into keywords 131. System 100 may tokenize keywords previously extracted text data stored as information 143 (as shown in FIG. 1) in content repository 140 (as shown in FIG. 1). In some embodiments, system 100 may remove any common keywords to tokenize keywords. For example, system 100 may remove articles ('a,' 'an,' and 'the') from words forming data of content 142 to generate tokenized keywords. In another example, repeated words across multiple sentences of data of content 142 may be limited to only one instance of a tokenized keyword. Tokenizing keywords 131 may include further formatting by including start and stop tokens. Start and stop tokens may represent the beginning and end of a sentence in data of content 142.

In step 920, system 100 may generate embeddings of tokenized keywords from step 910. Similar to step 910, system 100 may employ tokenizer 122 to execute step 920. System 100 may generate embeddings of tokenized keywords 131 by transforming keywords. System 100 may transform keywords 131 by changing the representation of keywords 131. For example, system 100 may transform each tokenized keyword representing a word in a sentence into a numerical representing position in a sentence. In another example, system 100, an embedding of a tokenized keyword may include a vector of all positions where the word is repeated in data of content 142.

In some embodiments, system 100 may include additional information to generate embeddings of tokenized keywords 131. For example, embeddings of tokenized keywords 131 may include a unique word in data of content 142 along with the number of times a word is repeated in content 142 and positions in the text of data of content 142 where tokenized keywords 131 are present.

In step 930, system 100 may extract features of embeddings generated in step 920. Similar to steps 910 and 920, system 100 may employ tokenizer 122 to execute step 930. System 100 may extract features by processing embeddings to generate additional details about each keyword. For example, features may include the frequency of a tokenized keyword of keywords 131 representing a word repeated in data of content 142. by System 100, upon completion of step 930, completes (step 999) executing method 900 on distributed computing system 700.

Figure 10:
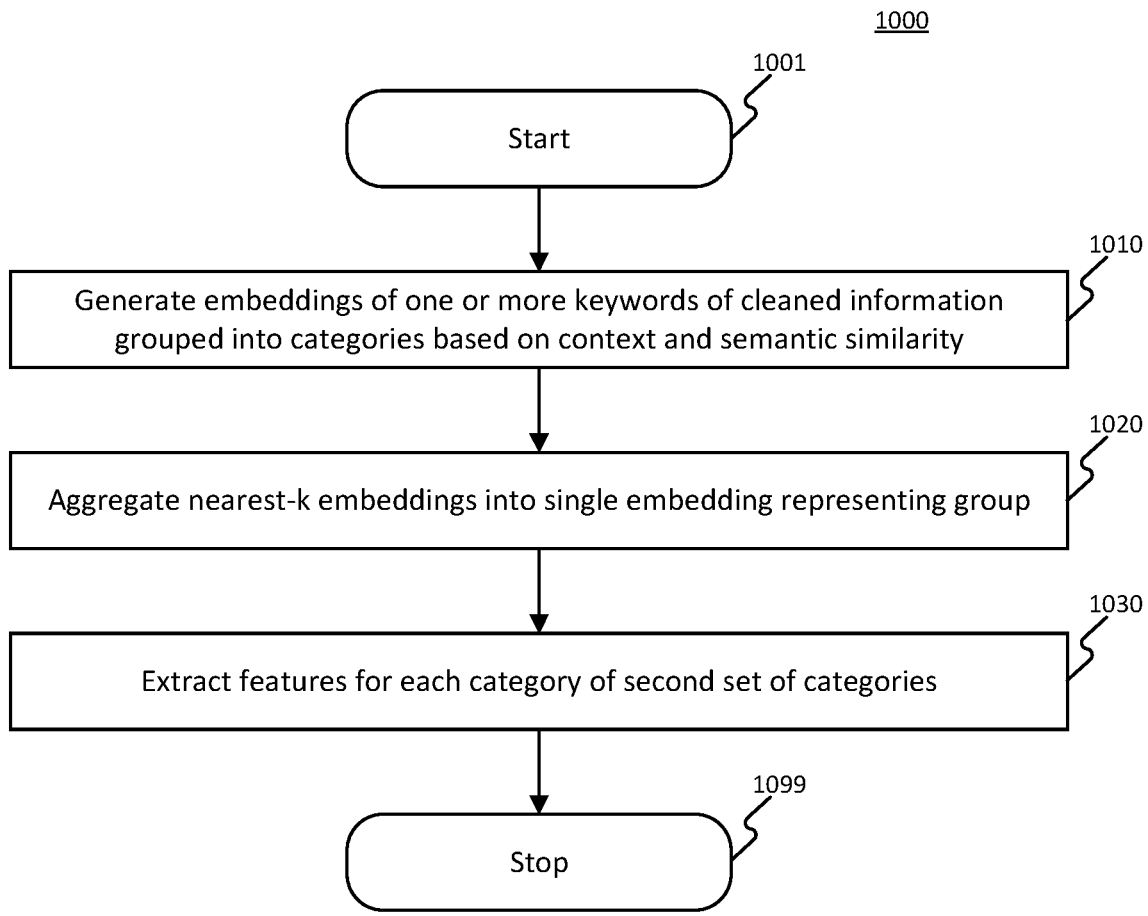
FIG. 10 is a flowchart illustrating an exemplary method for generating second level categories for content classification, according to some embodiments of the present disclosure.

FIG. 10 is a flowchart illustrating an exemplary method for generating second level categories for content classification, according to some embodiments of the present disclosure. The steps of method 1000 may be performed by, for example, system 100 of FIG. 1 executing on or otherwise using the features of distributed computing system 700 of FIG. 7 for purposes of illustration. It is appreciated that the illustrated method 1000 can be altered to modify the order of steps and to include additional steps.

In step 1010, system 100 may generate embeddings of keywords (e.g., keywords 131 of FIG. 1) of cleaned information (e.g., information 143 of FIG. 1) grouped into categories (e.g., categories 132 of FIG. 1). System 100 may select keywords based on semantic similarity to group them and generate embeddings to include as a part of a set of categories. System 100 may identify semantically similar keywords using a dictionary. In some embodiments, system 100 may determine context similarity to group based on a set of keywords of keywords 131 associated with a content instance in content 142 (as shown in FIG. 1). System 100 may group information of information 143 associated with two content instances in content 142 based on matching keywords of keywords 131 tagged to each content instance. For example, System 100 may group two content instances with matching tagged keywords related to travel may be grouped based on context similarity. System 100 may group categories associated with content instances based on embeddings of grouped keywords of keywords 131. In some embodiments, system 100 may employ aggregator 123 (as shown in FIG. 1) to perform step 1010.

In step 1020, system 100 may use the embeddings from step 1010 to identify a group of closely related embeddings and aggregate them. System 100 may aggregate closely related embeddings based on a statistical measurement. System 100 may use a statistical measurement to determine a filtered set of the most relevant and related embeddings to include in grouping categories into a second set of categories (e.g., second category set 212 of FIG. 2). System 100 may evaluate one embedding in a set of embeddings to identify the closely related embeddings. For example, system 100 may identify and aggregate nearest-k embeddings into a single embedding. Similar to step 1010, system 100 may use aggregator 123 to perform step 1020.

In step 1030, system 100 may extract features for each category of a set of categories from step 1010 associated with aggregated embeddings from step 1020. Like steps 1010 and 1020, system 100 may use aggregator 123 to perform step 1030. System 100 may employ a statistical method for extracting features, such as term frequency/inverse document frequency. System 100 may store extracted features in mining repository 130. System 100 may generate features to associate with information 143. Like steps 1010 and 1020, system 100 may employ aggregator 123 to perform step 1030. System 100, upon completion of step 1030, completes (step 1099) executing method 1000 on distributed computing system 700.

Figure 11:
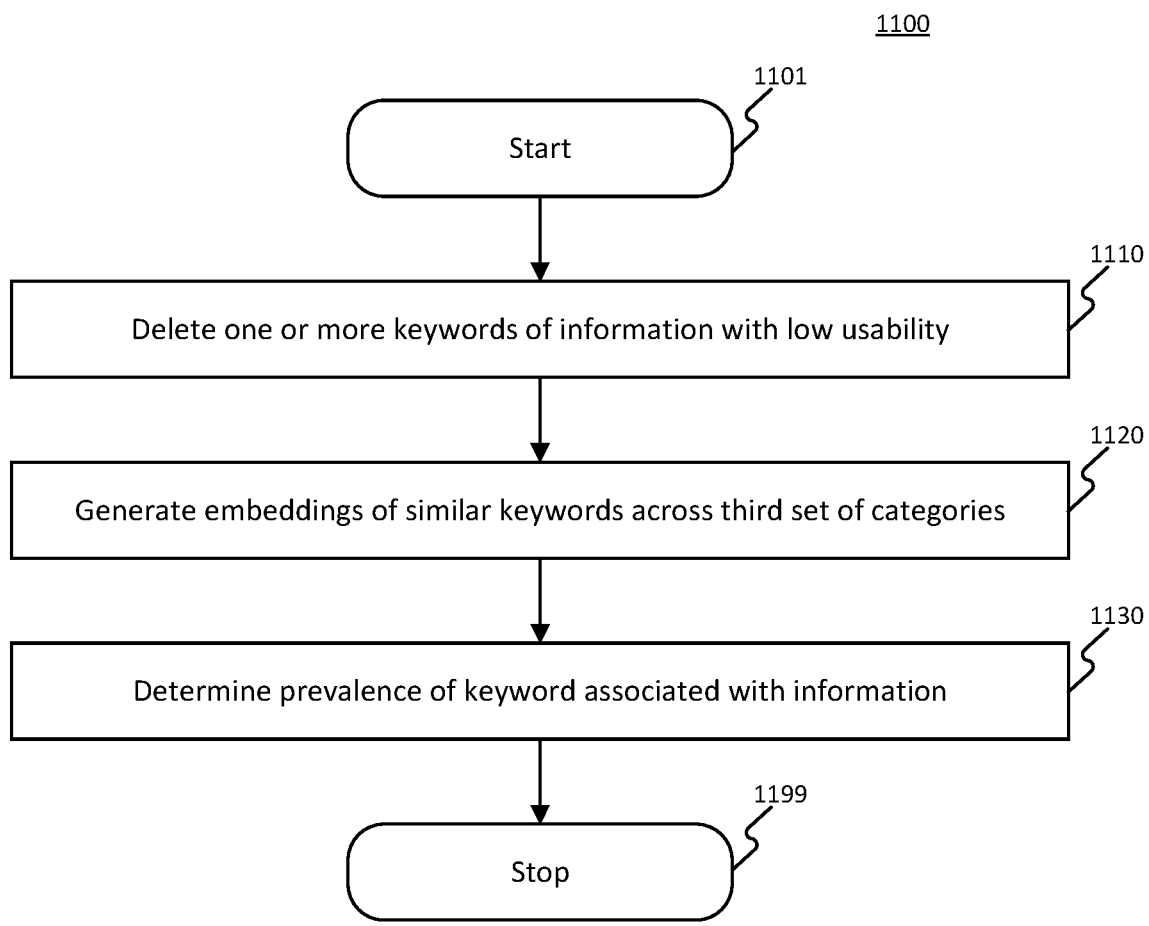
FIG. 11 is a flowchart illustrating an exemplary method for generating metadata at a third level for content classification, according to some embodiments of the present disclosure.

FIG. 11 is a flowchart illustrating an exemplary method for generating metadata at a third level for content classification, according to some embodiments of the present disclosure. The steps of method 1100 may be performed by, for example, system 100 of FIG. 1 executing on or otherwise using the features of distributed computing system 700 of FIG. 7 for purposes of illustration. It is appreciated that the illustrated method 1100 can be altered to modify the order of steps and to include additional steps.

In step 1110, system 100 may delete keywords 131 of information with low usability. In particular, measurer 113 of system 100 may delete keywords with low usability by performing a performance analysis of context. In some embodiments, system 100 may also perform frequency analysis. A detailed description of the context and frequency analysis of keywords is provided in FIG. 1 description above.

In step 1120, system 100 may generate embeddings of similar keywords across a third set of categories (e.g., third category set 222 in FIG. 2) to include in metadata 133. The third set of categories may include all categories 132 associated with all content 142. System 100 may generate embeddings of comparison between similar keywords. System 100 may determine similar keywords based on context or semantic similarity. System 100 may use a dictionary to determine semantically similar keywords. Similar to step 1110, system 100 may employ measurer 113 to perform step 1120.

In step 1130, system 100 may determine the prevalence of a keyword of keywords 131 associated with information (e.g., information 143). System 100 may determine the prevalence of a keyword by performing a frequency analysis of a keyword in a category. System 100 may also determine the prevalence of keywords across multiple categories. Keywords 131 across multiple categories 132 may include keywords that exist simultaneously across multiple categories. In some embodiments, frequency analysis may include calculating the frequency of keywords of content instances associated with a person of people 141. For example, System 100 reviews content instances created or uploaded to a content site to determine the creator frequency of keywords in information 143 associated with content instances associated with multiple categories 132. System 100 may employ statistical measures to determine the prevalence of keywords 131. Statistical measures may include term frequency/inverse document frequency (TF/IDF) to measure prevalence within and across categories associated with entire content 142. System 100 may include the prevalence data of keywords 131 in metadata 133 as part of generating the third set of categories.

Third set of categories may be determined using metadata 133 of keywords 131 populated in steps 1110-1130. System 100 may review metadata 133 to determine the most prevalent keywords and associated categories to include in the third set of categories. System 100 may review the embedding of comparison of similar keywords across categories to merge categories. System 100 may merge categories with the number of similar keywords above a threshold value. The threshold value for similarity may be provided as part user configuration of system 100. Similar to previous steps of method 1100, system 100 may employ measurer 113 to perform step 1130. System 100, upon completion of step 1130, completes (step 1199) executing method 1100 on distributed computing system 700.

Figure 12:
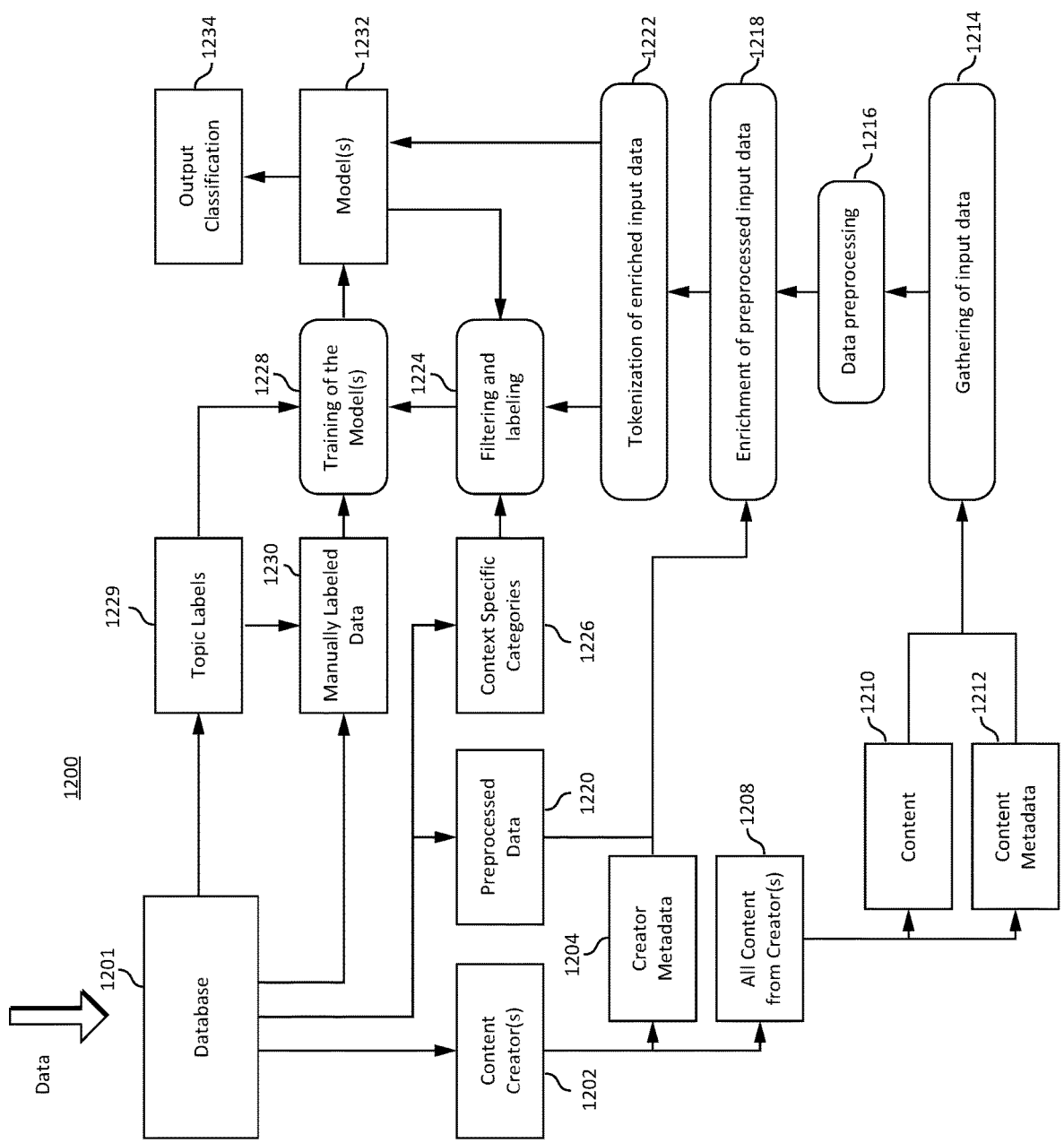
FIG. 12 is a flow diagram of exemplary steps for classification using machine learning, according to some embodiments of the present disclosure.

FIG. 12 is a system 1200 for classification using machine learning, according to some embodiments of the present disclosure. As illustrated in FIG. 12, system 1200 (which can be implemented using system 100 of FIG. 1 or system 700 of FIG. 7) may infer one or more classifications associated with one or more content creators by training one or more machine learning models using labeled data.

Database 1201 (e.g., mining repository 130 or content repository 140 of FIG. 1) may comprise data collected by one or more servers (not pictured) configured to perform at least one of web crawling or web scraping. In some embodiments, the collected data may be normalized. In some embodiments, the one or more servers may be external to system 100 and configured to communicate with system 100 via network 180. System 100 may utilize the collected data in database 1201 to perform at least one of machine learning model training or inferring one or more classifications using one or more trained machine learning models. For example, for performing machine learning model training, system 100 may retrieve data associated with a group of content creators 1202 (e.g., people 141 of FIG. 1), such as creator metadata 1204 associated with each creator of the group of content creators and all content 1208 from each creator of the group of content creators. For inferring one or more classifications, system 100 may retrieve data associated with a single content creator 1202, such as creator metadata 1204 associated with the single creator and all content 1208 associated with the single creator. All content 1208 may comprise content 1210 (e.g., content 142) and content metadata 1212 (e.g., metadata 133).

In some embodiments, system 100 may perform gathering of input data 1214, data preprocessing 1216, and enrichment of the input data 1218 iteratively for each content creator 1202. For example, for performing machine learning model training, system 100 may perform gathering of input data 1214, data preprocessing 1216, and enrichment of input data 1218 for a first content creator before performing gathering of input data 1214, preprocessing data 1216, and enriching preprocessed input data 1218 for a second content creator, and so on. Additionally or alternatively, for inferring one or more classifications, system 100 may perform gathering of input data 1214, data preprocessing 1216, and enrichment of input data 1218 for a single content creator. In some embodiments, system 100 may perform each of gathering of input data 1214, data preprocessing 1216 and enrichment of input data 1218 for all content creators of a group of content creators. For example, system 100 may perform gathering of input data 1214 for all content creators of the group of content creators before performing data preprocessing 1216 of gathered input data 1214 for all content creators of the group of content creators.

Categorization engine 101 may gather input data 1214 from content 1210 and content metadata 1212. In some embodiments, categorization engine 101 may determine one or more content types associated with content 1210 prior to gathering input data 1214. For example, categorization engine 101 may determine one or more content types based on content metadata 1212. Additionally or alternatively, categorization engine 101 may determine one or more content types based on one or more data structures of content 1210. In some embodiments, the one or more content types may comprise at least one of text, visual or audio. In some embodiments, each content type may be associated with a platform from which content was retrieved (e.g., social media platform, collaboration platform, blogging platform, e-commerce platform). Based on the determined one or more content types, categorization engine 101 may dynamically determine a set of input data to gather from each content instance of content 1210 and content metadata 1212. For example, based on determining that content 1210 includes one or more videos hosted by a social media platform, categorization engine 101 may gather one or more titles and one or more subtitles/captions (e.g., auto-generated or manually generated by the user) associated with the one or more videos. Additionally or alternatively, categorization engine 101 may not gather user generated video descriptions, a number of views, and a number of likes associated with the one or more videos. In some embodiments, categorization engine 101 may gather a set of input data based on a predetermined set of rules. By only gathering a specific set of input data 1214, system 100 may infer one or more classifications with higher accuracy and may also increase processing efficiency by removing unnecessary input data in further processing.

In some embodiments, gathering of input data 1214 may not be performed by system 100. For example, one or more external servers (not pictured) may be configured to perform at least one of web crawling or web scraping such that all content 1208 only includes a specific set of data collected based on content type. For example, for videos hosted by a social media platform, content metadata 1212 may include at least titles of the videos and one or more subtitles/captions, and may not include user generated video descriptions. Additionally or alternatively, the one or more external servers may be configured to store all data collected from web crawling or web scraping in a database external to system 100, and system 100 may be configured to retrieve and store only a specific set of data internally (e.g., mining repository 130 or content repository 140 of FIG. 1) based on content type. Doing so may optimize database storage and improve database efficiency.

Categorization engine 101 may perform data preprocessing 1216 of the gathered input data. For example, categorization engine 101 may clean, aggregate, divide, or normalize the gathered input data. A detailed description of various sub-steps in data preprocessing 1216 is provided in FIG. 13 description below.

Categorization engine 101 may enrich the input data 1218 with additional data. For example, categorization engine 101 may enrich the input data 1218 using at least one of creator metadata 1204 or preprocessed data 1220. Creator metadata 1204 may include at least one of a location, content format, or contextual information associated with one or more people of people 141. Preprocessed data 1220 may include any data from a database (e.g., database 1201, mining repository 130 or content repository 140 of FIG. 1). In some embodiments, preprocessed data 1220 may comprise one or more outputs of FIGS. 2-6, 8-11.

In some embodiments, categorization engine 101 may normalize the additional data by vectorizing the additional data to a common vector space. In some embodiments, enriching the normalized input data may include concatenating vectorized input data with vectorized additional data. In some embodiments, enriching the input data 1218 with additional data may include fusing vectorized input data with vectorized additional data. In some embodiments, enriching the input data 1218 with the additional data may include embedding additional data into the normalized input data.

Categorization engine 101 may tokenize the enriched input data 1222. In some embodiments, categorization engine 101 may tokenize the enriched input data based on semantic context. For example, categorization engine 101 may utilize one or more domain-specific encoder architectures to tokenize the input data such that each token captures underlying semantic content of the input data. In some embodiments, categorization engine 101 may represent tokens in a continuous vector space such that similar words are closer in the vector space. In some embodiments, each domain-specific encoder architecture may comprise a trained deep learning model fine-tuned to transform input data into tokens based on semantic context for a specific domain.

In some embodiments, categorization engine 101 may perform filtering and labeling 1224. For example, categorization engine 101 may group tokenized input data based on context specific categories 1226 and may create labels for training one or more machine learning models 1228. In some embodiments, categorization engine 101 may omit performing filtering and labeling 1224. For example, categorization engine 101 may determine whether a number of labels is greater than or equal to a predetermined label threshold. Based on determining that the number of labels is greater than or equal to the predetermined label threshold, categorization engine 101 may omit performing filtering and labeling 1224. Alternatively, based on determining that the number of labels is less than the predetermined label threshold, categorization engine 101 may perform filtering and labeling 1224. Additionally or alternatively, categorization engine 101 may perform filtering and labeling 1224 regardless of the number of labels. A detailed description of various sub-steps in filtering and labeling 1224 is provided in FIG. 14 description below.

In some embodiments, categorization engine 101 may perform training of one or more machine learning models 1228. For example, categorization engine 101 may train the one or more machine learning models based on at least one of an output of filtering and labeling 1224, one or more topic labels 1229, and manually labeled data 1230. System 100 may infer topic labels 1229 using data stored in database 1201. For example, inferring topic labels may include identifying a frequency of occurrence of keywords stored in database 1201. Additionally or alternatively, inferring topic labels may include ranking keywords based on the identified frequency. Additionally or alternatively, inferring topic labels may include selecting a number of keywords of the ranked keywords as topic labels. For example, system 100 may select a predetermined number of highest ranked (e.g., most frequently occurring) keywords to set as topic labels. Manually labeled data 1230 may comprise one or more inferred topic labels manually selected by one or more humans. In some embodiments, manually labeled data 1230 may be omitted.

Categorization engine 101 may use one or more machine learning model(s) 1232 to infer classification 1234. For example, one or more machine learning model(s) 1232 may comprise at least one of a monolithic system or a distributed system. In some embodiments, the one or more machine learning model(s) may comprise a neural network (e.g., Recurrent Neural Network (RNN), Convolutional Neural Network (CNN), Graph Neural Network (GNN), Transformer, Bidirectional Encoder Representations from Transformers (BERT), a Robustly Optimized BERT Pretraining Approach (ROBERTa), eXtreme Learning Net (XLNet), Embeddings from Language Models (ELMo), Long Short-Term Memory (LSTM)), word embeddings (e.g., Word2Vec, GloVe), k-nearest neighbors (KNN), k-means clustering, decision trees, support vector machines (SVM), random forest, linear regression, logistic regression, or a combination thereof. In some embodiments, output classification 1234 may correspond to one or more topic labels 1229 inferred from the database. A detailed description of various sub-steps in using the one or more machine learning model (s) 1232 to output classification 1234 is provided in FIG. 15 description below.

Figure 13:
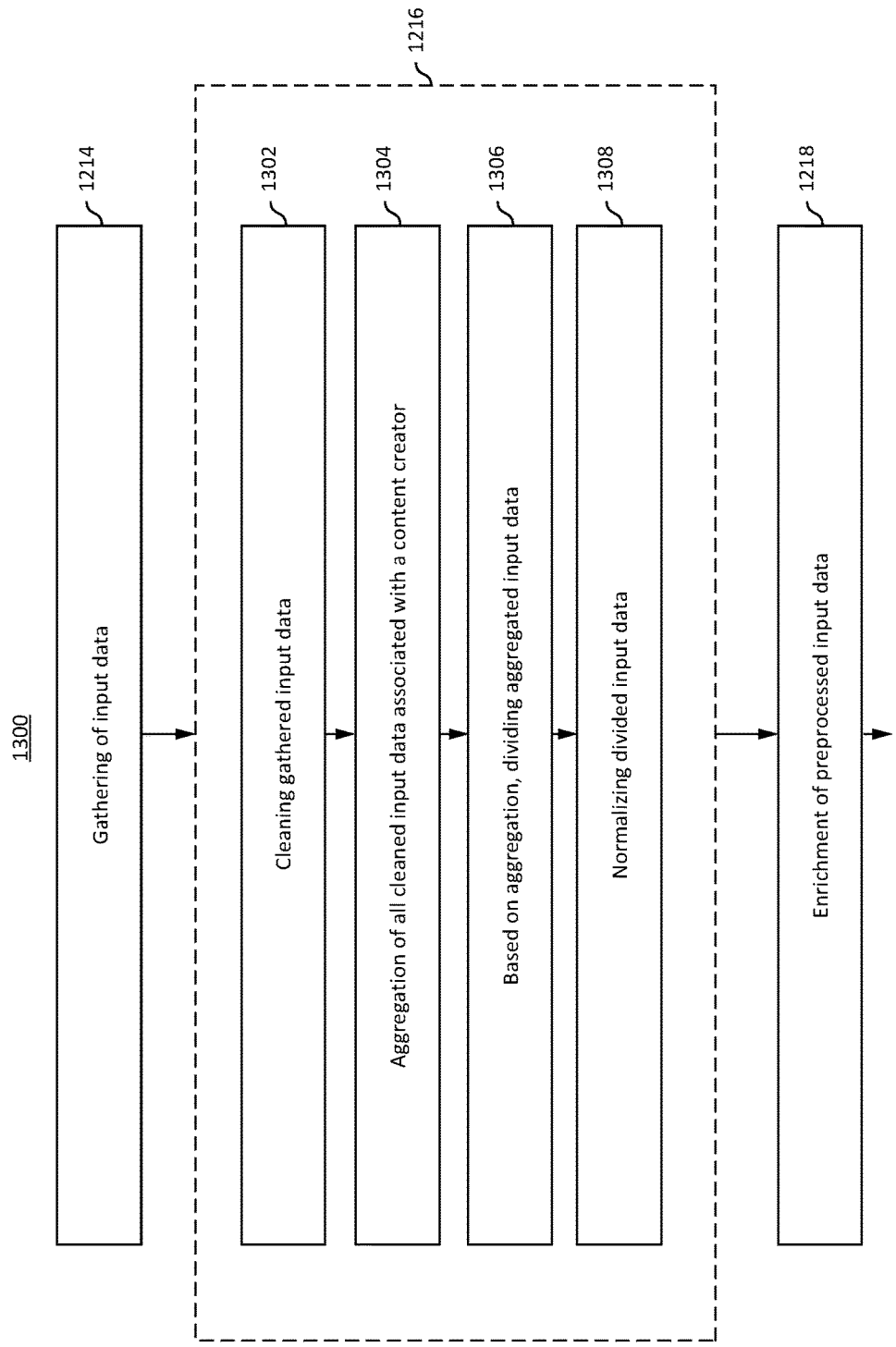
FIG. 13 is a flow diagram of exemplary steps for data preprocessing according to some embodiments of the present disclosure.

FIG. 13 is a flow diagram 1300 of exemplary steps for data preprocessing according to some embodiments of the present disclosure. As illustrated in FIG. 13, after gathering input data 1214, system 100 may preprocess input data 1216 by cleaning the gathered input data, aggregating all data across a single content creator, dividing aggregated data (if necessary), and normalizing input data.

In some embodiments, data preprocessing 1216 may include cleaning the gathered input data 1302. For example, cleaning the gathered input data may include fixing grammatical and typographic errors. In some embodiments, cleaning the gathered input data may include removing one or more stop words or one or more common words from a corpus of keywords (e.g., keywords 131) associated with content. For example, the corpus of keywords may comprise a domain-specific corpus associated with content 1210. In some embodiments, the domain-specific corpus may correspond to a content type associated with content 1210.

In some embodiments, data preprocessing 1216 may include aggregating all input data associated with a content creator 1304 and dividing the aggregated input data into smaller sets 1306. For example, the titles of all video content instances of content 1210 for a content creator may be combined into a single string. Categorization engine 101 may be configured to determine whether the aggregated input data exceeds a predetermined threshold size. Based on determining that the aggregated input data exceeds the predetermined threshold size, categorization engine 101 may be configured to divide the aggregated input data into smaller sets such that there are no more than a predetermined number of sets. For example, categorization engine 101 may be configured to divide the aggregated input data into no more than 5 sets in order to maintain meaningful granularity of the aggregated input data. In some embodiments, categorization engine 101 may dynamically determine the number of sets for division based on analysis of the aggregated input data. For example, system 100 may be configured to analyze a quality of the aggregated input data to determine an optimal number of sets that the aggregated input data can be divided into. In some embodiments, categorization engine 101 may dynamically determine the number of sets for division by using an optimization function. In some embodiments, the predetermined number of sets is manually preset and associated with content type. In some embodiments, dividing the aggregated data 1306 may be omitted based on determining that the aggregated input data does not exceed the predetermined threshold size.

In some embodiments, categorization engine 101 may be configured to perform pruning of aggregated input data. For example, each smaller set may be limited to a predetermined set size. In some embodiments, the aggregated input data may be so large that once the aggregated input data is divided into the maximum number of smaller sets, one or more of the smaller sets may be greater than the predetermined set size. Pruning may comprise analyzing the features of one or more of the smaller sets to identify and delete unnecessary information from the one or more smaller sets. Unnecessary information may comprise duplicative information or any information that categorization engine 101 determines is not extra information. In some embodiments, categorization engine 101 may repeat performing random division of the aggregated input data into new smaller sets and pruning until each smaller set is less than or equal to the predetermined set size. In some embodiments, categorization engine 101 may perform random deletion of sub-data of the aggregated input data or the smaller sets.

In some embodiments, data preprocessing 1216 may include normalizing the input data 1308. In some embodiments, normalizing the input data may include performing character encoding to encode all text in the input data into a consistent character encoding format. Additionally or alternatively, normalizing the input data may include tokenizing text in the input data by splitting the text into one or more single words or short sentences. In some embodiments, normalizing the input data may include converting all text in the input data to lowercase or include converting all dates (e.g., Jan. 1, 2023, Jan. 1, 2023, and 1 Jan. 2023) into a common format (e.g., 2023-01-01). Additionally or alternatively, normalizing the input data may include removing one or more punctuation marks and special characters from text in the input data. Additionally or alternatively, normalizing the input data may include performing one or more natural language processing (NLP) techniques, such as stemming or lemmatization.

In some embodiments, normalizing the input data may include standardizing the input data to a common language. For example, when categorization engine 101 identifies that the input data include text in different scripts, categorization engine 101 may perform transliteration to convert the text of the input data to a common script. Alternatively, when categorization engine 101 identifies that the input datasets include text in different human languages, categorization engine 101 may perform language-specific processing steps. In some embodiments, language-specific processing steps may include at least one of tokenization, stemming, lemmatization, or any other NLP technique specific to a language. In some embodiments, normalizing the input data may include translating the input data to a common language.

In some embodiments, normalizing the input data may include vectorizing the input data to a common vector space. For example, categorization engine 101 may perform feature extraction to convert the input data into numerical features that can be represented as feature vectors. In some embodiments, feature extraction may comprise converting text of the input data into word embeddings. For example, feature extraction may comprise using at least one of Word2Vec, FastText, or BERT to convert text into word embeddings. In some embodiments, feature extraction may comprise converting images of the input data into vectors. For example, feature extraction may comprise using at least one convolutional neural network (CNN) or pre-trained image embeddings to convert images into vectors. In some embodiments, categorization engine 101 may normalize the feature vectors to a consistent scale. In some embodiments, categorization engine 101 may map the normalized feature vectors into a common vector space. In some embodiments, categorization engine 101 may perform at least one of alignment or transformation on the mapped feature vectors.

After data preprocessing 1216 is completed, categorization engine 101 may proceed to enriching input data 1218, as discussed in FIG. 12 description above.

Figure 14:
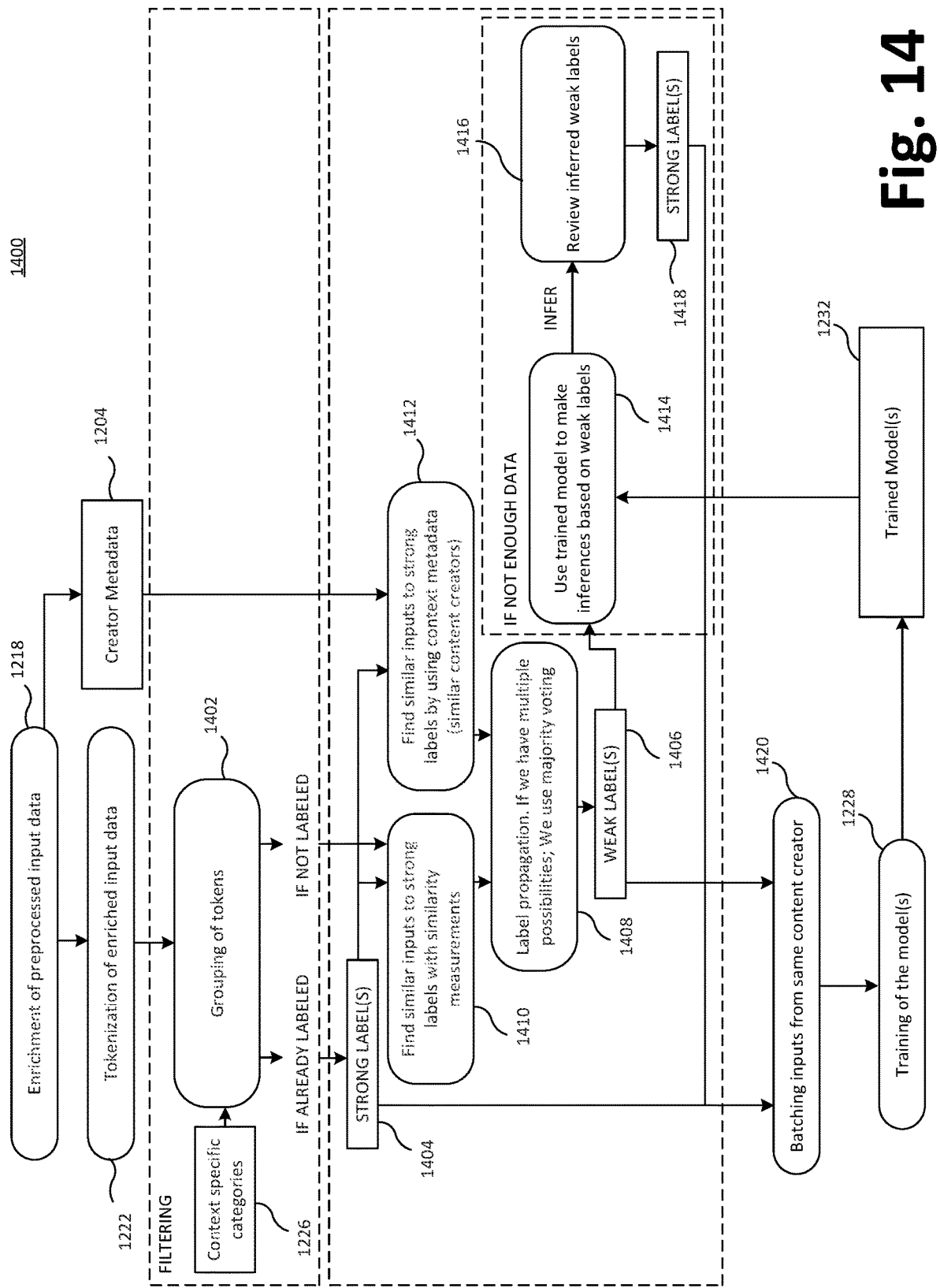
FIG. 14 is a flow diagram of exemplary steps for filtering and labeling according to some embodiments of the present disclosure.

FIG. 14 is a flow diagram 1400 of exemplary steps for filtering and labeling according to some embodiments of the present disclosure. As illustrated in FIG. 14, after enrichment of input data 1218 and tokenization of input data 1222, categorization engine 101 may perform filtering and labeling for training one or more machine learning models.

In some embodiments, categorization engine 101 may perform filtering by grouping tokens. For example, categorization engine 101 may group tokens to prepare machine learning model training data. In some embodiments, categorization engine 101 may group tokens based on context specific categories 1226 retrieved from a database (e.g., database 1201 of FIG. 12). In some embodiments, context specific categories may comprise categories assigned to content by content creators. For example, when a content creator uploads content to a platform, the content creator may assign one or more context specific categories to the content. In some embodiments, different platforms may have different sets of context specific categories available for assignment to content. For example, a set of categories available for assignment to content on a social media platform may be different from a set of categories available for assignment to content on an e-commerce platform. Additionally, a set of categories available for assignment to content on a first social media platform may be different from a set of categories available for assignment to content on a second social media platform. In some embodiments, context specific categories may comprise categories automatically assigned by the platform where content was uploaded.

In some embodiments, context specific categories may comprise one or more predetermined categories. In some embodiments, categorization engine 101 may utilize context specific categories to identify one or more models of a distributed machine learning system. For example, each machine learning model of the distributed machine learning system may be trained to receive inputs associated with one or more specific categories of the context specific categories. In some embodiments, categorization engine 101 may utilize context specific categories to identify feature groups for creating weak labels. Doing so may reduce a context space for identifying similar content creators, which may improve computational efficiency and accuracy in creating weak labels. In addition, with content being categorized to a smaller set of categories, less features may be needed for training, thereby reducing computing resources and increasing computation speed and accuracy. In some embodiments, a randomized set of inputs that are not associated with a particular category of the context specific categories may be used as a negative label during training. Doing so may enrich an amount of data and may help address issues with data imbalance, thereby improving accuracy. Context specific categories may provide pre-classification of content based on content type and context.

In some embodiments, categorization engine 101 may group tokens of different content creators based on contextual similarities. For example, categorization engine 101 may determine contextual similarities between tokens. A contextual similarity may comprise a measure of similarity in context between two tokens. By virtue of tokens being generated based on input data enriched with creator metadata, contextual similarities may represent a measure of similarity in context between two persons of people 141. In some embodiments, a contextual similarity may be represented by a distance (e.g., cosine distance) between token vectors. For example, tokens may be represented in a continuous vector space with contextually similar tokens being closer in the vector space. In some embodiments, using the determined contextual similarities, categorization engine 101 may group tokens by grouping two or more tokens that are within a threshold contextual similarity. For example, categorization engine 101 may group a first token associated with a first person, a second token associated with a second person, and a third token associated with a third person after determining that they are within a threshold distance of one another in the continuous vector space. In some embodiments, categorization engine 101 may dynamically determine the threshold contextual similarity for grouping tokens. For example, categorization engine 101 may execute a maximization function to determine an optimal threshold.

In some embodiments, categorization engine 101 may identify tokens with strong labels 1404. Strong labels may refer to tokens associated with content that has been prelabeled or content creators who have been prelabeled. For example, a subset of content creators may have already been classified and their classifications stored in a database (e.g., database 1201 of FIG. 12). Additionally or alternatively, a subset of content may have already been classified and their classifications stored in a database (e.g., database 1201 of FIG. 12). In some embodiments, strong labels may refer to verified labels. For example, strong labels may be associated with tokens with classifications manually verified by one or more humans. Additionally or alternatively, strong labels may be associated with tokens with classifications verified by system 100.

In some embodiments, categorization engine 101 may generate weak labels 1406 by performing label propagation 1408 to assign labels to unlabeled tokens based on strong labels. For example, using the grouped tokens, categorization engine 101 may identify similar tokens using similarity measurements 1410. Similarity measurements may comprise at least one of graph-based measurements or kernels used to quantify a similarity between tokens in the vector space. In some embodiments, categorization engine 101 may identify similar tokens based on context metadata 1412. For example, categorization engine 101 may identify similar tokens based on creator metadata 1204 to identify tokens associated with similar content creators. Based on the outputs of similarity measurements 1410 and context metadata 1412, categorization engine 101 may perform label propagation to propagate strong labels to neighboring unlabeled tokens. In some embodiments, based a similarity measurement greater than or equal to a similarity threshold, categorization engine 101 may propagate strong labels to neighboring unlabeled tokens. In some embodiments, such as when multiple strong labels are neighboring an unlabeled token, categorization engine 101 may perform majority voting to assign a label that occurs most frequently as the weak label for the token. In some embodiments, generating weak labels may comprise verifying that a candidate weak label exceeds a predetermined confidence value, wherein the predetermined confidence value may be associated with the similarity threshold.

In some embodiments, trained model(s) 1232 may be used to infer one or more weak labels based on existing weak labels 1414. For example, trained model(s) 1232 may be used to infer one or more weak labels when there is not enough data to determine weak labels. Additionally or alternatively, one or more weak labels may be inferred when there are a large number of neighboring strong labels, but majority voting does not accurately represent an actual value of soft labels. Additionally or alternatively, one or more weak labels may be inferred based on a trigger. For example, one or more flags may be raised that trigger a weak label to be sent to inference, wherein the one or more flags may be raised based on statistical analysis of the data and the strong labels. For example, when a number of different labels determined exceeds a dynamic threshold determined based on the data (e.g., median number of labels for an input is 10 but 50 different labels are determined), one or more flags may be raised and the weak label sent to inference. In some embodiments, process 1400 may include reviewing inferred weak labels 1416 to generate strong labels. For example, weak labels inferred by trained model(s) that have polarized confidence may be reviewed by one or more humans. Based on the review, one or more additional strong labels 1418 may be generated for training model(s) 1228. Additionally or alternatively, one or more weak labels inferred by trained model(s) may be discarded upon review.

In some embodiments, categorization engine 101 may take strong labels 1404, strong labels 1418, and weak labels 1406 and batch labels from the same content creator into a single batch 1420 for training model(s) 1228 to create trained model(s) 1232. In some embodiments, categorization engine 101 may batch labels 1420 for each content creator to output a plurality of batches, each batch associated with a content creator. For example, as discussed above with respect to FIG. 13, aggregated input data associated with a content creator may be divided into smaller sets 1306. Each smaller set may be associated with different categories (e.g., set A comprises content related to politics and sports, set B comprises content related to sports and education, set C comprises content related to politics and education). When labeling of the smaller sets is performed (e.g., as discussed with respect to FIG. 14), labeling may be performed for each content creator as a whole. In other words, even if a smaller set does not comprise content related to a certain category, the smaller set may be labeled with a category associated with the content creator (e.g., set A may be labeled as including politics, sports, and education). Without batching the labeled smaller sets, there may be problems during training of the one or more machine learning models because content may be labeled as including content of a certain category even though it does not. Batching may provide the one or more machine learning models with more complete data, thereby reducing noise in training the one or more machine learning models as well as improving accuracy in classifying data.

Figure 15:
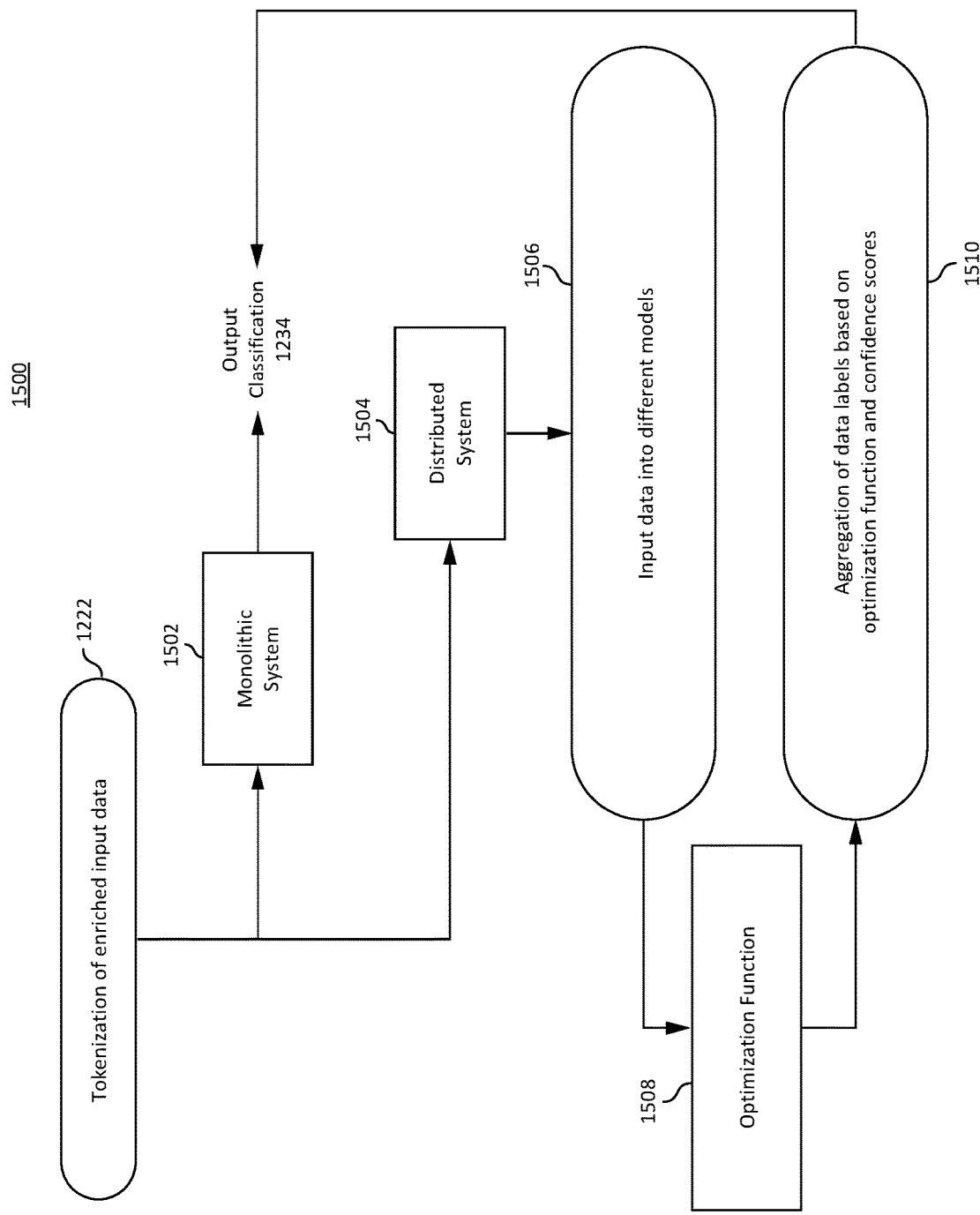
FIG. 15 is a flow diagram 1500 of exemplary steps for using one or more trained machine learning models for inferring classification according to some embodiments of the present disclosure.

FIG. 15 is a flow diagram 1500 of exemplary steps for using one or more trained machine learning models for inferring classification according to some embodiments of the present disclosure. As illustrated in FIG. 15, system 100 may use either a monolithic system or a distributed system to infer one or more classifications.

In some embodiments, system 100 may utilize monolithic system 1502. Monolithic system 1502 may comprise a single machine learning model trained to infer one or more classifications for input data. Utilizing a monolithic system may offer advantages such as simplicity in deployment and management.

In some embodiments, system 100 may utilize distributed system 1504. Distributed system 1504 may comprise multiple machine learning models trained for parallel processing to infer one or more classifications. In some embodiments, each machine learning model of distributed system 1504 may be associated with one or more categories (e.g., categories 132 of FIG. 1). Using tokenized enriched input data, such as metadata of the input data, system 100 may determine one or more first categories associated with the input data. Based on the determined one or more first categories, system 100 may input tokenized enriched input data 1506 into each machine learning model of distributed system 1504 associated with the one or more first categories. Each machine learning model may output one or more data labels or classifications. For example, system 100 may input each tokenized and enriched smaller set (e.g., smaller set 1306 of FIG. 13) into one or more models of the multiple machine learning models of distributed system 1504 to output a confidence score for each smaller set. A confidence score may comprise a score indicating a likelihood that the input data corresponds to a data label or classification output by one or more machine learning models of distributed system 1504. System 100 may implement an optimization function 1508 configured to determine an optimal minimum threshold. In some embodiments, the optimization function may comprise a maximization function. Based on the output confidence scores and the determined minimum threshold, system 100 may determine whether to proceed or end the inferring process. For example, system 100 may determine an overall confidence value (e.g., average confidence value) based on the confidence scores and may compare the overall confidence value to the minimum threshold. Based on determining that the overall confidence value is less than the minimum threshold, the inferring process may end.

Based on determining that the overall confidence value is greater than the minimum threshold value, system 100 may proceed to aggregate data labels 1510. In some embodiments, system 100 may rank the output one or more data labels or classifications based on the optimization function and the one or more confidence scores. In some embodiments, system 100 may output one or more classifications 1234 based on aggregated data labels. For example, system 100 may output all data labels or classifications associated with a confidence score above the confidence score threshold.

Figure 16:
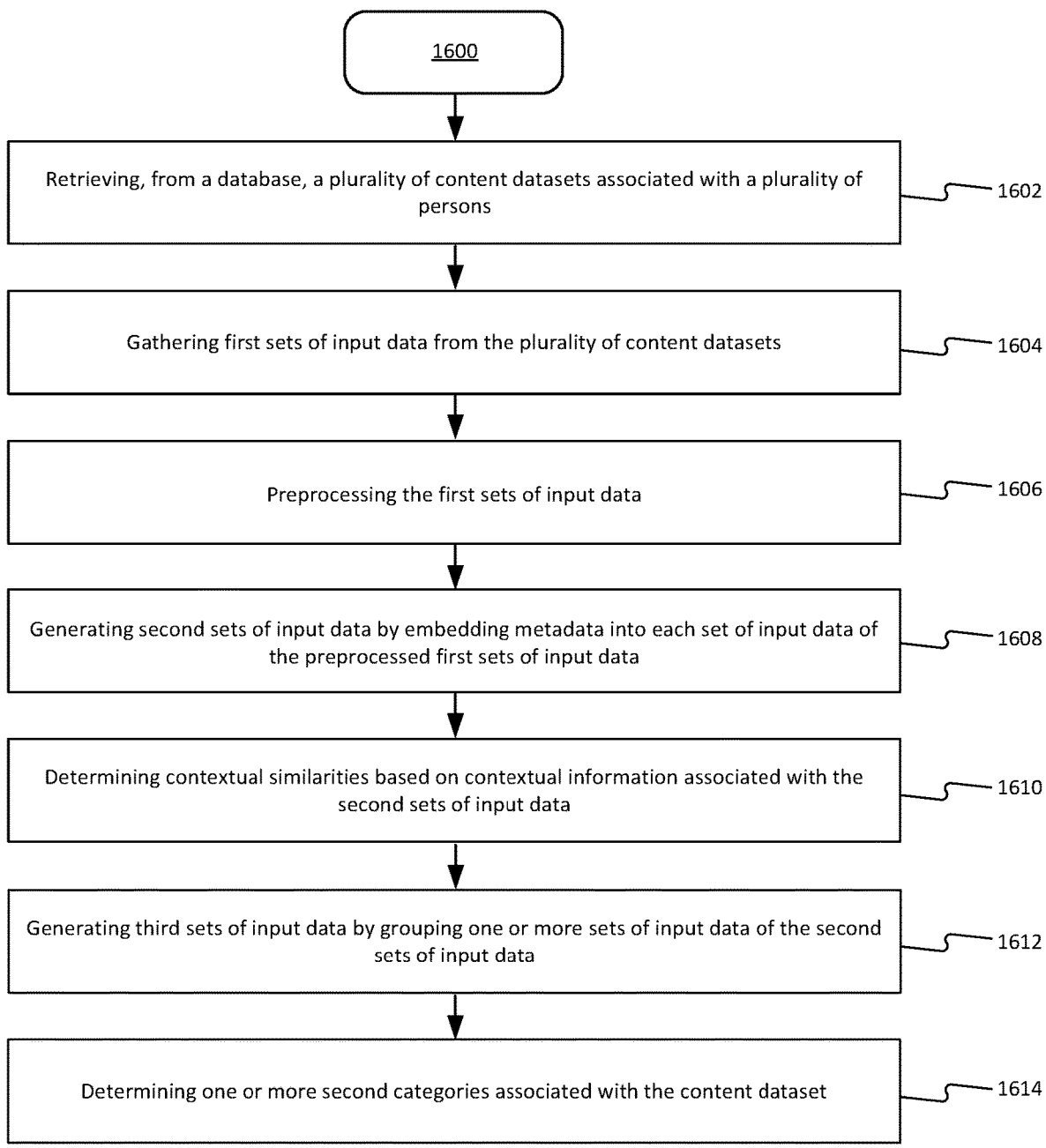
FIG. 16 is a flowchart illustrating an exemplary method for classifying content using artificial intelligence, according to some embodiments of the present disclosure.

FIG. 16 is a flowchart illustrating an exemplary method for classifying content using artificial intelligence, according to some embodiments of the present disclosure. The steps of method 1600 may be performed by, for example, system 100 of FIG. 1 or system 1200 of FIG. 12 executing on or otherwise using the features of distributed computing system 700 of FIG. 7 for purposes of illustration. It is appreciated that the illustrated method 1600 can be altered to modify the order of steps and to include additional steps.

In step 1602, system 1200 may retrieve, from a database, a plurality of content datasets. Each content dataset of the plurality of content datasets may be associated with a person of the plurality of persons (e.g., people 141 of FIG. 1) and may include at least one of content associated with the person, first metadata associated with the person, second metadata associated with the content (e.g., metadata 133 of FIG. 1), or one or more first categories (e.g., categories 132 of FIG. 1) associated with the content dataset. Content may comprise at least one of text data, audio data, video data, image data, presentation data, metadata, tag data, header data, author data, or identification information in at least one of human, computer, and machine languages. In some embodiments, the person of the plurality of persons may be an author of the associated content.

In step 1604, system 1200 may gather first sets of input data from the plurality of content datasets. Each set of input data of the first sets of input data may be associated with a person of the plurality of persons. In some embodiments, gathering first sets of input data from the plurality of content datasets may comprise gathering one or more keywords from the plurality of content datasets. In some embodiments, gathering first sets of input data from the plurality of content datasets may comprise gathering all content and associated content metadata associated with a person from a database (e.g., database 1201 of FIG. 12). A detailed description of gathering input data is provided in FIG. 12 description above.

In step 1606, system 1200 may preprocess the first sets of input data. System 1200 may preprocess the first sets of input data by performing at least one of cleaning the first sets of input data, aggregating the cleaned first sets of input data, dividing the aggregated input data into a plurality of first subsets of input data, and normalizing the plurality of first subsets of input data. Cleaning the first sets of input data may comprise resolving grammatical or typographical errors in the gathered first sets of input data. In some embodiments, dividing the aggregated input data into a plurality of first subsets may comprise dividing the aggregated input data into no more than a predetermined number of subsets. Normalizing the plurality of first subsets of input data may comprise at least one of removing one or more stop words from a corpus of keywords, removing one or more common words from the corpus of keywords, or normalizing text across different languages.

In some embodiments, preprocessing the first sets of input data may comprise cleaning the first sets of input data, normalizing the cleaned first sets of input data to a specific range, and performing one or more data augmentation techniques to create variations of the first sets of input data. Additionally or alternatively, cleaning the first sets of input data may comprise identifying one or more removeable sets of the first sets of input data to remove, wherein the one or more removeable sets are identified as corrupted or irrelevant, and removing the one or more removeable sets of the first sets of input data. Additionally or alternatively, cleaning the first sets of input data may comprise modifying at least one of a resolution or format of one or more sets of the first sets of input data. A detailed description of data preprocessing is provided in FIG. 13 description above.

In step 1608, system 1200 may generate second sets of input data. System 1200 may generate second sets of input data by embedding associated first metadata and second metadata into each set of input data of the preprocessed first sets of input data. For example, generating the second sets of input data may comprise embedding associated first metadata and second metadata into each subset of the normalized plurality of first subsets of input data. A detailed description of enrichment of preprocessed input data is provided in FIG. 12 description above.

In step 1610, system 1200 may determine a plurality of contextual similarities based on contextual information associated with the second sets of input data. Each contextual similarity may comprise a measure of similarity in context between two persons of the plurality of persons. In some embodiments, system 1200 may generate tokenized data by tokenizing the second sets of input data based on the contextual information. In some embodiments, generating tokenized data may comprise tokenizing the second sets of input data into one or more single words or short sentences. A detailed description of tokenization of enriched input data is provided in FIG. 12 description above.

In step 1612, system 1200 may generate third sets of input data. System 1200 may generate third sets of input data by grouping one or more sets of input data of the second sets of input data based on the determined plurality of contextual similarities. In some embodiments, generating third sets of input data may be based on tokenized data. A detailed description of generating third sets of input data (e.g., filtering and labeling) is provided in FIG. 14 description above.

In some embodiments, system 1200 may generate training data. System 1200 may generate training data based at least on the third sets of input data. In some embodiments, generating training data may comprise identifying a plurality of keywords from the plurality of content datasets, ranking the plurality of keywords based on a frequency of occurrence, and generating a first set of categories based on the ranked plurality of keywords. In some embodiments, a first keyword associated with a high frequency of occurrence may be ranked higher than a second keyword associated with a low frequency of occurrence. Generating training data may further comprise retrieving fourth sets of input data from the database and generating training data based on the third sets of input data, fourth sets of input data, and first set of categories. In some embodiments, system 1200 may train one or more machine learning models based on the training data.

In step 1614, system 1200 may determine one or more second categories associated with the content dataset. System 1200 may determine one or more second categories associated with the content dataset for each content dataset of the plurality of content datasets using the trained one or more machine learning models. In some embodiments, the one or more machine learning models may be part of a monolithic system. In some embodiments, the one or more machine learning models may be part of a distributed system. A detailed description of determining one or more second categories (e.g., classification) is provided in FIG. 15 description above.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart or block diagram block or blocks.

Any combination of one or more computer readable medium(s) may be utilized. The computer readable medium may be a non-transitory computer readable storage medium. In the context of this document, a computer readable storage medium may be any tangible medium (e.g., storage device 714) that can contain or store a program for use by or in connection with an instruction execution system, apparatus, or device for performing operations consistent with those described above (e.g., operations provided in FIGS. 12-16).

Program code embodied on a computer readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method for classifying content, the method comprising:
    retrieving, from one or more databases, a plurality of content datasets, wherein each content dataset of the plurality of content datasets is associated with a person of a plurality of persons and includes:
        content associated with the person,
        first metadata associated with the person,
        second metadata associated with the content, and
        one or more first categories associated with the content dataset;
    gathering first sets of input data from the plurality of content datasets, wherein each set of input data of the first sets of input data is associated with a person of the plurality of persons;
    preprocessing the first sets of input data by:
        cleaning the first sets of input data,
        aggregating the cleaned first sets of input data,
        dividing the aggregated input data into a plurality of first subsets of input data, and
        normalizing the plurality of first subsets of input data;
    generating second sets of input data by embedding associated first metadata and second metadata into each subset of the normalized plurality of first subsets of input data;
    determining a plurality of contextual similarities based on contextual information associated with the second sets of input data, wherein each contextual similarity comprises a measure of similarity in context between two persons of the plurality of persons;
    generating third sets of input data by grouping one or more sets of input data of the second sets of input data based on the determined plurality of contextual similarities; and
    determining, for each content dataset of the plurality of content datasets using one or more machine learning models, one or more second categories associated with the content dataset.

2. The method of claim 1, wherein the content comprises at least one of text data, audio data, video data, image data, presentation data, metadata, tag data, header data, author data, or identification information in at least one of human, computer, and machine languages.

3. The method of claim 1, wherein the person of the plurality of persons is an author of the associated content.

4. The method of claim 1, wherein gathering first sets of input data from the plurality of content datasets comprises gathering one or more keywords from the plurality of content datasets.

5. The method of claim 1, wherein cleaning the first sets of input data comprises resolving grammatical or typographical errors in the gathered first sets of input data.

6. The method of claim 1, wherein the plurality of first subsets of input data comprises no more than a predetermined number of subsets.

7. The method of claim 1, wherein normalizing the plurality of first subsets of input data comprises at least one of:
removing one or more stop words from a corpus of keywords,
removing one or more common words from the corpus of keywords, or
normalizing text across different languages.

8. The method of claim 1, wherein preprocessing the first sets of input data comprises:
cleaning the first sets of input data;
normalizing the cleaned first sets of input data to a specific range; and
performing one or more data augmentation techniques to create variations of the first sets of input data.

9. The method of claim 8, wherein cleaning the first sets of input data comprises:
identifying one or more removeable sets of the first sets of input data to remove, wherein the one or more removeable sets are identified as corrupted or irrelevant; and
removing the one or more removeable sets of the first sets of input data.

10. The method of claim 8, wherein cleaning the first sets of input data comprises modifying at least one of a resolution or format of one or more sets of the first sets of input data.

11. The method of claim 1, further comprising:
generating tokenized data by tokenizing the second sets of input data based on the contextual information, wherein generating third sets of input data is based on the tokenized data.

12. The method of claim 11, wherein generating tokenized data comprises tokenizing the second sets of input data into one or more single words or short sentences.

13. The method of claim 1, wherein generating training data further comprises:
identifying a plurality of keywords from the plurality of content datasets;
ranking the plurality of keywords based on a frequency of occurrence, wherein a first keyword associated with a high frequency of occurrence is ranked higher than a second keyword associated with a low frequency of occurrence; and
generating a first set of categories based on the ranked plurality of keywords.

14. The method of claim 13, wherein generating training data further comprises:
retrieving fourth sets of input data from the database; and
generating the training data based on the third sets of input data, fourth sets of input data, and first set of categories.

15. The method of claim 1, wherein the one or more machine learning models are part of a monolithic system or a distributed system.

16. The method of claim 1, further comprising:
generating training data based at least on the third sets of input data;
training the one or more machine learning models based on the training data; and
determining, for each content dataset of the plurality of content datasets using the one or more trained machine learning models, one or more second categories associated with the content dataset.

17. A system comprising:
one or more memory devices storing processor-executable instructions; and
one or more processors configured to execute instructions to cause the system to perform operations comprising:
retrieving, from a database, a plurality of content datasets, wherein each content dataset of the plurality of content datasets is associated with a person of a plurality of persons and includes:
content associated with the person,
first metadata associated with the person,
second metadata associated with the content, and
one or more first categories associated with the content dataset;
gathering first sets of input data from the plurality of content datasets, wherein each set of input data of the first sets of input data is associated with a person of the plurality of persons;
preprocessing the first sets of input data by:
cleaning the first sets of input data,
aggregating the cleaned first sets of input data,
dividing the aggregated input data into a plurality of first subsets of input data, and
normalizing the plurality of first subsets of input data;
generating second sets of input data by embedding associated first metadata and second metadata into each subset of the normalized plurality of first subsets of input data;
determining a plurality of contextual similarities based on contextual information associated with the second sets of input data, wherein each contextual similarity comprises a measure of similarity in context between two persons of the plurality of persons;
generating third sets of input data by grouping one or more sets of input data of the second sets of input data based on the determined plurality of contextual similarities; and
determining, for each content dataset of the plurality of content datasets using one or more machine learning models, one or more second categories associated with the content dataset.

18. A non-transitory computer readable medium including instructions that are executable by one or more processors to cause a system to perform operations for classification of content, the operations comprising:
retrieving, from a database, a plurality of content datasets, wherein each content dataset of the plurality of content datasets is associated with a person of the plurality of persons and includes:
content associated with the person,
first metadata associated with the person,
second metadata associated with the content, and
one or more first categories associated with the content dataset;
gathering first sets of input data from the plurality of content datasets, wherein each set of input data of the first sets of input data is associated with a person of the plurality of persons;
preprocessing the first sets of input data by:
cleaning the first sets of input data,
aggregating the cleaned first sets of input data,
dividing the aggregated input data into a plurality of first subsets of input data, and
normalizing the plurality of first subsets of input data;
generating second sets of input data by embedding associated first metadata and second metadata into each subset of the normalized plurality of first subsets of input data;
determining a plurality of contextual similarities based on contextual information associated with the second sets of input data, wherein each contextual similarity comprises a measure of similarity in context between two persons of the plurality of persons;

generating third sets of input data by grouping one or more sets of input data of the second sets of input data based on the determined plurality of contextual similarities; and determining, for each content dataset of the plurality of content datasets using one or more machine learning models, one or more second categories associated with the content dataset.

* * * * *